United States Patent
Moser et al.

(10) Patent No.: US 7,305,582 B1
(45) Date of Patent: Dec. 4, 2007

(54) CONSISTENT ASYNCHRONOUS CHECKPOINTING OF MULTITHREADED APPLICATION PROGRAMS BASED ON ACTIVE REPLICATION

(75) Inventors: Louise E. Moser, Santa Barbara, CA (US); Peter M. Melliar-Smith, Santa Barbara, CA (US)

(73) Assignee: Availigent, Inc., San Jose, CA (US)

( * ) Notice: Subject to any disclaimer, the term of this patent is extended or adjusted under 35 U.S.C. 154(b) by 884 days.

(21) Appl. No.: 10/651,756

(22) Filed: Aug. 30, 2003

Related U.S. Application Data

(60) Provisional application No. 60/407,584, filed on Aug. 30, 2002.

(51) Int. Cl.
*G06F 11/00* (2006.01)

(52) U.S. Cl. .............................. 714/13; 714/6; 714/11; 714/12

(58) Field of Classification Search .................. 714/12, 714/6, 11, 13
See application file for complete search history.

(56) References Cited

U.S. PATENT DOCUMENTS

| | | | | |
|---|---|---|---|---|
| 5,257,381 A | * | 10/1993 | Cook ......................... | 719/318 |
| 5,440,726 A | * | 8/1995 | Fuchs et al. .................. | 714/20 |
| 5,794,034 A | * | 8/1998 | Harinarayan et al. ....... | 718/102 |
| 5,799,146 A | * | 8/1998 | Badovinatz et al. ........... | 714/4 |
| 5,802,265 A | * | 9/1998 | Bressoud et al. ............. | 714/11 |
| 5,802,267 A | * | 9/1998 | Shirakihara et al. .......... | 714/15 |
| 5,941,999 A | * | 8/1999 | Matena et al. ................. | 714/6 |
| 5,956,489 A | * | 9/1999 | San Andres et al. ......... | 709/221 |
| 5,996,088 A | * | 11/1999 | Frank et al. ................... | 714/6 |
| 6,192,391 B1 | * | 2/2001 | Ohtani ........................ | 709/201 |
| 6,338,147 B1 | * | 1/2002 | Meth et al. .................... | 714/13 |
| 6,539,446 B1 | * | 3/2003 | Chan ........................... | 710/200 |
| 6,928,577 B2 | * | 8/2005 | Moser et al. .................. | 714/4 |
| 7,162,599 B2 | * | 1/2007 | Berkowitz et al. .......... | 711/162 |
| 7,194,652 B2 | * | 3/2007 | Zhou et al. .................... | 714/4 |

(Continued)

OTHER PUBLICATIONS

Stallings, William; Operating Systems: Internals and Design Principles, Third Edition; 1998; Prentice-Hall, Inc.; pp. 276-277.*

(Continued)

*Primary Examiner*—Scott Baderman
*Assistant Examiner*—Joshua Lohn
(74) *Attorney, Agent, or Firm*—John P. O'Banion

(57) ABSTRACT

A method for checkpointing a multithreaded application program, based on the egalitarian and competitive active replication strategy. The invention enables different threads to be checkpointed at different times in such a way that the checkpoints restore a consistent state of the threads at a new or recovering replica, even though the threads operate concurrently and asynchronously. Separate checkpoints are generated for the local state of each thread and for the data that are shared between threads and are protected by mutexes. The checkpoint of the shared data is communicated in a special message that also determines the order in which the claims of mutexes are granted to the threads. A source-code preprocessor tool is described for inserting code into an application program to checkpoint the state of the thread during normal operation and to restore the state of the thread from the checkpoint subsequently.

35 Claims, 20 Drawing Sheets

U.S. PATENT DOCUMENTS

2002/0032883 A1* 3/2002 Kampe et al. ................ 714/16
2002/0194525 A1* 12/2002 Mathiske et al. .............. 714/5
2003/0187911 A1* 10/2003 Abd-El-Malek et al. .... 709/108
2005/0050386 A1* 3/2005 Reinhardt et al. ............ 714/13
2005/0229035 A1* 10/2005 Peleska et al. ................ 714/12

OTHER PUBLICATIONS

Dieter, WR. and Lumpp, J.E.; A User-level Checkpointing Library for POSIX Threads Programs; Twenty-Ninth Annual International Symposium on Falut Tolerant Computing; 1999; pp. 224-227.*

* cited by examiner

CONSISTENT ASYNCHRONOUS CHECKPOINTING OF MULTITHREADED APPLICATION PROGRAMS BASED ON ACTIVE REPLICATION

CROSS-REFERENCE TO RELATED APPLICATIONS

This application claims priority from U.S. provisional application Ser. No. 60/407,584 filed on Aug. 30, 2002, incorporated herein by reference.

STATEMENT REGARDING FEDERALLY SPONSORED RESEARCH OR DEVELOPMENT

This invention was made with Government support under Grant No. 70NANBOH3015 awarded by the U.S. Department of Commerce, National Institute of Standards & Technology. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the public file or record of the United States Patent and Trademark Office, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention relates generally to software-based fault-tolerant computer systems and, more specifically, to checkpointing and restoration of the states of the threads of objects, processes or other components of multithreaded application programs that are replicated using active replication.

2. Incorporation by Reference.

The following patent and publications are incorporated herein by reference:

PATENTS

U.S. Pat. No. 4,665,520
U.S. Pat. No. 5,301,309
U.S. Pat. No. 5,440,726
U.S. Pat. No. 5,630,047
U.S. Pat. No. 5,802,267
U.S. Pat. No. 6,338,147

PUBLICATIONS

R. E. Strom and S. Yemini, Optimistic recovery in distributed systems, ACM Transactions on Computer Systems, vol. 3, no. 3, August 1985, pp. 204-206.

R. Koo and S. Toueg, Checkpointing and rollback-recovery in distributed systems, IEEE Transactions on Software Engineering, vol. SE-13, no. 1, January 1987, pp. 23-31.

B. Bhargava and S. Lian, Independent and concurrent rollback for recovery in distributed systems—An optimistic approach, Proceedings of the IEEE 7th Symposium on Reliable Distributed Systems, Columbus, Ohio, October 1988, pp. 3-12.

E. N. Elnozahy, D. B. Johnson and W. Zwaenepoel, The performance of consistent checkpointing, Proceedings of the IEEE 11th Symposium on Reliable Distributed Systems, Houston, Tex., October 1992, pp. 3947.

Y. Huang and C. M. R. Kintala, Software implemented fault tolerance: Technologies and experience, Proceedings of the IEEE 23rd International Symposium on Fault-Tolerant Computing, Toulouse, France, June 1993, pp. 2-9.

K. P. Birman and R. van Rennesse, Reliable Distributed Computing Using the Isis Toolkit, IEEE Computer Society Press, 1994.

J. S. Plank, M. Beck, G. Kingsley and K. Li, Libckpt: Transparent checkpointing under Unix, Proceedings of the USENIX Winter 1995 Technical Conference, New Orleans, La., January 1995, pp. 213-224.

L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54-63.

J. Srouji, P. Schuster, M. Bach and Y. Kuzmin, A transparent checkpoint facility on NT, Proceedings of the 2nd USENIX Windows NT Symposium, Seattle, Wash., August 1998, pp. 77-85.

O. P. Damani, A. Tarafdar and V. K. Garg, Optimistic recovery in multi-threaded distributed systems, Proceedings of the IEEE 18th Symposium on Reliable Distributed Systems, Lausanne, Switzerland, October 1999, pp. 234-243.

K. Whisnant, Z. Kalbarczyk and R. K. Iyer, Micro-checkpointing: Checkpointing of multithreaded applications, Proceedings of the IEEE International On-Line Testing Workshop, Palma de Mallorca, Spain, July 2000, pp. 3-8.

M. Kasbekar and C. R. Das, Selective checkpointing and rollbacks in multithreaded distributed systems, Proceedings of the IEEE 21st International Conference on Distributed Computing Systems, Mesa, Ariz., April 2001, pp. 39-46.

W. R. Dieter and J. E. Lumpp, Jr., User-level checkpointing for LinuxThreads programs, Proceedings of the FREENIX Track, USENIX Annual Technical Conference, Boston, Mass., June 2001, pp. 81-92.

C. D. Carothers and B. K. Szymanski, Checkpointing multithreaded programs, Dr. Dobb's Journal, vol. 27, issue 8, August 2002, pp. 46-51.

3. Description of Related Art.

Fault-tolerant computer systems are based on entity redundancy (replication) to mask faults and, thus, to provide continuous service to their users. In software fault tolerance, the entities that are replicated are the objects, processes or other components of the application programs. Distributed systems provide the opportunity for fault tolerance by allowing replicas of such entities to be hosted on different computers. In distributed computing, a client invokes a method of a server by sending a request message containing the method invocation to that server and by receiving a reply message containing the response from that server. In a fault-tolerant distributed computer system, the server is replicated, but the client can also be replicated, particularly in a multi-tier or peer-to-peer application.

Checkpointing plays an important part in the design and implementation of fault-tolerant computer systems, as is well known in the prior art. The state of a process, object or other component is extracted and is stored as a checkpoint. Subsequently, the checkpoint is used to initialize the state of a new or recovering replica on the same or a different computer. Checkpointing has had a long history, much of which concerns the checkpointing of one or more processes. However, little of that history concerns the checkpointing of the threads of a process, object or other component of a multithreaded application program.

Most prior work on multithreaded checkpointing relies on a technique called barrier synchronization that suspends all of the threads of a process and then checkpoints the entire process. The disadvantage of that approach is that, in general, it is not possible to suspend all of the threads at a moment in time without interrupting the service provided by the application. Furthermore, there might never occur a moment in time at which all of the threads are naturally quiescent and can be checkpointed together.

Fault-tolerant systems based on active replication strategies typically employ a multicast group communication system, such as Isis (K. P. Birman and R. van Rennesse, Reliable Distributed Computing Using the Isis Toolkit, IEEE Computer Society Press, 1994, incorporated herein by reference), or Totem (L. E. Moser, P. M. Melliar-Smith, D. A. Agarwal, R. K. Budhia and C. A. Lingley-Papadopoulos, Totem: A fault-tolerant multicast group communication system, Communications of the ACM, vol. 39, no. 4, April 1996, pp. 54-63, incorporated herein by reference), that delivers messages, containing invocations and responses, reliably and in the same order to all of the replicas. However, if the replicas are multithreaded, and if the threads of the replicas access the shared data in different orders, then a consistent message order alone, as provided by a multicast group communication system, does not suffice to maintain consistency of the states of the replicas.

DESCRIPTION OF RELATED WORK

The fundamental papers on checkpointing within distributed systems include R. E. Strom and S. Yemini, Optimistic recovery in distributed systems, ACM Transactions on Computer Systems, vol. 3, no. 3, August 1985, pp. 204-206, incorporated herein by reference, R. Koo and S. Toueg, Checkpointing and rollback-recovery in distributed systems, IEEE Transactions on Software Engineering, vol. SE-13, No. 1, January 1987, pp. 23-31, incorporated herein by reference, and B. Bhargava and S. Lian, Independent and concurrent rollback for recovery in distributed systems—An optimistic approach, Proceedings of the IEEE 7th Symposium on Reliable Distributed Systems, Columbus, Ohio, October 1988, pp. 3-12, incorporated herein by reference. These papers do not disclose mechanisms for checkpointing multithreaded application programs.

In U.S. Pat. No. 4,665,520 which is incorporated herein by reference and also in R. E. Strom and S. Yemini, Optimistic recovery in distributed systems, ACM Transactions on Computer Systems, vol. 3, no. 3, August 1985, pp. 204-206, incorporated herein by reference, Strom and Yemini disclose a scheme for asynchronous checkpointing of processes in a distributed system, wherein received messages are logged to prevent cascade rollback. The scheme employs a dependency tracking mechanism to maintain a consistent system-wide state of multiple processes within the distributed system and to ensure that causal dependency relationships among messages are maintained. Those works, however, do not address asynchronous checkpointing of multithreaded processes.

U.S. Pat. No. 5,440,726, which is incorporated herein by reference, discloses a progressive retry method and apparatus for checkpointing and recovery for multi-process message-passing applications. A central checkpoint coordinator and a central recovery coordinator are used to obtain and restore, respectively, a set of globally consistent checkpoints across multiple processes within a distributed system. Multiple threads within a single process that may be within a single computer are not disclosed.

U.S. Pat. No. 5,630,047, which is incorporated herein by reference, also addresses the need to maintain consistent global checkpoints of processes in a distributed system. That patent introduces the notions of a maximum consistent global checkpoint and of minimum consistent global checkpoint sets. When a fault occurs, each of the processes is rolled back to a checkpoint in the maximum consistent global checkpoint set. If the same fault occurs again, each of the processes is rolled back to a checkpoint in the minimum consistent global checkpoint set. That technique employs a rollback dependency graph to determine the maximum and minimum consistent global checkpoints; however, it does not address multithreaded processes.

U.S. Pat. No. 5,802,267, which is incorporated herein by reference, discloses mechanisms that perform a checkpoint by stopping communication between processes on different computers, while allowing normal processing and communication between processes on the same computer. The teaching involves a checkpoint command process that starts (and stops) the checkpointing of each process, and that commands each process to stop (and start) communicating with other processes. It allows a process on one computer to continue executing while a process on another computer is being checkpointed, but does not allows a thread of an object, process or other component on one computer to continue executing while a different thread of that same object, process or other component on that same computer is being checkpointed.

U.S. Pat. No. 6,338,147, which is incorporated herein by reference, teaches checkpointing of processes in a parallel program. Every process of the program is responsible for taking its own checkpoint and for initiating its own restart, wherein the entire process checkpoints itself.

In U.S. Pat. No. 5,301,309, which is incorporated herein by reference, only processes external to the application program can be responsible for checkpointing and restarting the application program.

In E. N. Elnozahy, D. B. Johnson and W. Zwaenepoel, The performance of consistent checkpointing, Proceedings of the IEEE 11th Symposium on Reliable Distributed Systems, Houston, Tex., October 1992, pp. 39-47, incorporated herein by reference, Elnozahy et. al. describe methods for checkpointing multiple processes that communicate with each other by message passing. Each process is checkpointed independently, and then a consistent set of checkpoints is determined, from which the computation can be restarted. The teachings within that paper do not address multithreaded processes where data are shared between threads within a process.

The libft checkpointing library (Y. Huang and C. M. R. Kintala, Software implemented fault tolerance: Technologies and experience, Proceedings of the IEEE 23rd International Symposium on Fault-Tolerant Computing, Toulouse, France, June 1993, pp. 2-9, incorporated herein by reference), requires the application programmer to specify critical data structures and their association with the threads of the application program, and the application programmer is responsible for ensuring the correctness of state after a rollback.

The libckpt checkpointing library (J. S. Plank, M. Beck, G. Kingsley and K. Li, Libckpt: Transparent checkpointing under Unix, Proceedings of the USENIX Winter 1995 Technical Conference, New Orleans, La., January 1995, pp. 213-224, incorporated herein by reference), supports asynchronous (forked) checkpointing, incremental checkpointing, memory exclusion and user-directed checkpointing. However, it does not support the checkpointing of multithreaded processes and requires manual programming efforts to configure the application program.

Srouji et. al. (J. Srouji, P. Schuster, M. Bach and Y. Kuzmin, A transparent checkpoint facility on NT, Proceedings of the USENIX 2nd Windows NT Symposium, Seattle, Wash., August 1998, pp. 77-85, incorporated herein by reference), describe a checkpointing library for Windows/NT, which also works on UNIX (AIX and FreeBSD) platforms. The facility checkpoints an entire process, by suspending all threads within the process, which is problematic for threads that are in the middle of system calls.

Damini et. al. (O. P. Damani, A. Tarafdar and V. K. Garg, Optimistic recovery in multi-threaded distributed systems, Proceedings of the IEEE 18th Symposium on Reliable Distributed Systems, Lausanne, Switzerland, October 1999, pp. 234-243, incorporated herein by reference), extends the optimistic recovery algorithm of Strorh and Yemini, described above, to multithreaded programs by accounting for individual threads using a distributed dependency-tracking mechanism. Their strategy is based on message-passing communication and dependencies that arise from messages.

In the micro-checkpointing strategy of (K. Whisnant, Z. Kalbarczyk and R. K. Iyer, Micro-checkpointing: Checkpointing of multithreaded applications, Proceedings of the IEEE International On-Line Testing Workshop, Palma de Mallorca, Spain, July 2000, pp. 3-8, incorporated herein by reference), checkpoints are not process-wide, and threads do not need to be suspended to take a checkpoint. Micro-checkpointing is defined in terms of micro-operations, which result from flattening the conventional nested control flow of a program into sequential micro-operations, each of which must be individually locked. There is no concept of shared data. The micro-checkpointing mechanisms maintain a checkpoint buffer in which a micro-operation stores its state on entry into each micro-operation. Different threads can update their parts of the checkpoint buffer concurrently. After every message transmission, the mechanisms commit the checkpoint buffer to stable storage, which can be fairly expensive from a resource standpoint. No updates to the checkpoint buffer are allowed while the checkpoint is being saved.

Kasbekar and Das (M. Kasbekar and C. R. Das, Selective checkpointing and rollbacks in multithreaded distributed systems, Proceedings of the IEEE 21st International Conference on Distributed Computing Systems, Mesa, Ariz., April 2001, pp. 39-46, incorporated herein by reference), focus on checkpoints and rollbacks in multithreaded object-oriented distributed systems based on non-blocking coordinated checkpointing by using a message passing approach.

Kasbekar and Das use a dependency-tracking mechanism in which any object can initiate a selective checkpoint. The dependency-tracking mechanism tracks messages to identify the threads and objects that depend on the initiator. The rollback protocol of that invention is a coordinator-based two-phase protocol, and in which a recovery line is determined when a checkpoint is restored.

The checkpointing library for LinuxThreads described in (W. R. Dieter and J. E. Lumpp, Jr., User-level checkpointing for LinuxThreads programs, Proceedings of the FREENIX Track, USENIX Annual Technical Conference, Boston, Mass., June 2001, pp. 81-92, incorporated herein by reference), essentially checkpoints the entire binary image of a process, including the process address space, thread registers, thread library state, signal handlers and open file descriptors. To checkpoint a process, the checkpointing library blocks all threads of the process, except the main thread, to prevent the threads from changing the state of the process while it is being saved. The checkpointing library for LinuxThreads does not work in the general case where processes on the same or different computers communicate with each other.

Carothers and Szymanski (C. D. Carothers and B. K. Szymanski, Checkpointing multithreaded programs, Dr. Dobb's Journal, vol. 27, issue 8, August 2002, pp. 46-51, incorporated herein by reference), have also developed a checkpointing strategy for multiple threads. Like Dieter and Lumpp, the teachings of Carothers and Szymanski stop all threads in a process to take a checkpoint. Their innovation is the manner in which they use the do_fork( ) function to copy the memory space so that the threads can continue to execute while the checkpoint is being recorded.

Therefore, a need exists for a method of checkpointing multithreaded application programs based on active replication, that provides asynchronous checkpointing while still maintaining consistency of the state of the replicas as outlined above. The present invention satisfies those needs, as well as others, and overcomes the deficiencies of previously developed checkpointing mechanisms.

BRIEF SUMMARY OF THE INVENTION

The present invention is a method for checkpointing the objects, processes or other components of a multithreaded application program, that is replicated using the egalitarian and competitive active replication strategy, where it is not possible to stop and checkpoint all of the threads of an object, process or other component simultaneously. Separate checkpoints are generated for the local state of each thread and for the data that are shared between threads and are protected by mutexes. Unlike barrier synchronization, the present invention allows different threads of an object to be checkpointed at different times so that the checkpoints restore a consistent state of the threads even though the threads operate concurrently and asynchronously.

This invention is described in terms of an application program that consists of one or more objects, which encapsulate the data of the program and provide methods for manipulating that data. The term object is used to refer generally to an object, process or other component of the application program. Each executing object consists of one or more threads. Threads communicate with each other, either by accessing shared data or by invoking methods that are communicated in messages, the ordering and delivery of which are controlled by the infrastructure.

When threads access shared data, it is necessary to prevent two threads from accessing the shared data at the same time because simultaneous access can produce unpredictable results. The mechanism used to prevent simultaneous access to the shared data is called a mutex, controlled by mutex functions, which include claim and release functions. Each shared data is controlled by a mutex. When a thread invokes the claim( ) function for a mutex, the mutex provides exclusive access to the shared data until the thread invokes the release( ) function. If a second thread invokes the claim( ) function for the mutex during the period of exclusive access, the second thread must wait until the first thread invokes the release( ) function for the mutex.

In active replication (sometimes referred to as the state-machine approach), the program code of the replicas of an object, process or other component is identical and the replicas execute their copies of the code concurrently. The order in which the replicas process messages and the order in which mutexes are granted to the threads of the replicas is determined competitively based on the first message received from the replicas.

The preferred embodiment of the invention utilizes a Consistent Multithreading (CMT) library and associated distributed mutex mechanisms. The CMT library and distributed mutex mechanisms ensure that, when an object is replicated, the mutexes are granted to the corresponding threads in the replicas in the same order. The CMT library contains wrapper functions for the functions of the operating system thread library. The distributed mutex mechanisms use mutex ordering information in messages that are communicated between the replicas to achieve this consistent order of granting mutexes to threads. The present invention utilizes those mechanisms to record and restore checkpoints of the threads of the objects of multithreaded application programs, that are replicated using active replication, in order to achieve consistency of the state of a new or recovering replica with that of the replicas being checkpointed.

Kinds of State

The mechanisms of the present invention provide checkpoints for threads and shared data for two kinds of data (state), private thread state and shared data.

Private thread state is accessed only by the particular thread and is checkpointed as a part of the checkpointing of the thread. The mechanisms of the invention assist in the recording and subsequent restoring of private thread state.

Shared data can be accessed by several threads. The mechanisms of the invention assist in the recording and subsequent restoring of shared data by exploiting the mutexes that control access to the shared data.

Kinds of Threads

The mechanisms of the present invention support three kinds of threads, stateless threads, invoked-checkpoint threads and self-checkpointing threads.

A stateless thread is a thread that has no private state (including no private state implicit in the program counter). An example of a stateless thread is a thread, within a thread pool, that can be activated to process a message but that is not currently processing a message. A stateless thread can access shared state by claiming mutexes. Because a stateless thread contains no state, a stateless thread is never checkpointed. The mechanisms of the invention assist in checkpointing programs that contain stateless threads.

An invoked-checkpoint thread is a thread for which a get_thread_state( ) method of the thread is invoked by the checkpoint infrastructure and executed by the thread. The invocation is queued until the thread has become quiescent, i.e., has completed its prior method invocation and is ready to accept a new method invocation. Quiescence simplifies the taking of a checkpoint because it is not necessary to record or recreate the current position of the thread in its sequential flow of control.

A self-checkpointing thread is a thread that periodically reads an object checkpoint number to determine whether the checkpoint infrastructure has initiated a new checkpoint of the object and, thus, whether it needs to checkpoint its state. Examples of self-checkpointing threads are "perpetual" threads that never become quiescent or that take a long time to complete. Self-checkpointing threads are more difficult to program, because the program must contain checks on the need to take a checkpoint so that the checkpoints are taken sufficiently frequently. The mechanisms of this invention assist the application programmer in placing such checks at appropriate points in the program.

Even more difficult, for a self-checkpointing thread, is recording, and subsequently recreating, the current position of the thread in its flow of control. If the thread is within a nested method invocation, the checkpoint must record that method invocation and its parameters, as well as values of the local variables of that method invocation. When restarting from a checkpoint, the thread must enter the nested method invocation, setting the values of the parameters and of the local variables from the checkpoint. This invention introduces a tool that assists the application programmer in the creation of code for self-checkpointing threads.

Checkpointing and restoring the local state of threads is straightforward, but checkpointing and restoring the shared data is more complicated. In the mechanisms of this invention, the shared data are preferably checkpointed by utilizing a wrapper of the mutex claim( ) function that controls access to the shared data.

Information Required for Checkpointing

The information required for checkpointing consists of:

Invoked-checkpoint thread references that the checkpoint infrastructure uses to invoke the get_thread_state( ) and set_thread_state( ) methods of the invoked-checkpoint threads.

Self-checkpointing thread references that the checkpoint infrastructure uses to invoke the restore_thread_state( ) method of the self-checkpointing threads. The corresponding record_thread_state( ) method is a method of the checkpoint infrastructure that the self-checkpointing threads invoke.

Mutexes, together with references to invoke the claim( ) and releases functions of the mutexes, that protect the shared data.

Shared data references that the mutexes use to invoke the get_shared_data( ) and set_shared_data( ) methods of the shared data.

objectCheckpointNumber for each object that corresponds to the most recent checkpoint that the checkpoint infrastructure initiated.

threadCheckpointNumber for each thread that corresponds to the most recent checkpoint that the thread recorded.

mutexCheckpointNumber for each mutex that corresponds to the most recent checkpoint that the mutex recorded for the shared data that it protects.

Asynchronous Checkpointing of Threads

The invention disclosed herein allows different threads, within an object, process or other component of a multi-threaded application program that is replicated using active replication, to be checkpointed at different times in such a way that the checkpoints restore a consistent state of the threads even though the threads operate concurrently and asynchronously.

To initiate a new checkpoint, the checkpoint infrastructure first increments the objectCheckpointNumber. It then invokes the get_thread_state( ) method for each invoked-checkpoint thread. Concurrently, each self-checkpointing thread notes that the objectCheckpointNumber has increased and invokes the record_thread_state( ) method, supplying its checkpoint as a parameter to that method.

An invoked-checkpoint thread might be processing another invocation and might not be able to process the get_thread_state( ) method immediately. Moreover, a self-checkpointing thread might not note the incremented objectCheckpointNumber immediately, or might not be in a state in which it can record the checkpoint. In addition, shared data might be currently locked by a thread and, thus, might be unavailable for checkpointing until the thread releases the mutex. It is possible, indeed likely, that no moment of time ever exists at which all of the threads of an object are simultaneously quiescent or, otherwise, available for checkpointing.

Consequently, the mechanisms of the present invention checkpoint the threads of an object incrementally while those threads are executing. Moreover, the mechanisms of the invention checkpoint different threads, and also different shared data, at different times, with values that did not exist at the same time, and possibly could not exist at the same time.

The invention employs a Consistent Multithreading (CMT) library and a distributed mutex mechanism. The preferred embodiment of the invention utilizes a Consistent Multithreading (CMT) library and associated distributed mutex mechanisms which ensure that, when an object is replicated, the mutexes are granted to the corresponding threads in the replicas in the same order. The CMT library contains wrapper functions for the functions of the operating system thread library that claim and release mutexes, semaphores, condition variables, and so forth, and is interposed ahead of the operating system thread library. When the application program invokes the claim( ) and release( ) functions, it actually invokes the corresponding wrapper functions of the CMT library, which in turn invoke the claim( ) and release( ) functions of the operating system thread library. In the present invention, the CMT claim( ) wrapper function generates checkpoints for shared data, and restores the values of the shared data from the checkpoints. It maintains a M.grantedClaims queue, which records the order in which mutexes are granted to threads, and utilizes a GrantedClaims message, which communicates the mutex ordering, granting and checkpointing information to the replicas of an object.

The invention teaches how the checkpointing information for shared data is associated with the mutex ordering and granting information that defines the order in which mutexes are granted to threads, in a GrantedClaims message and how the GrantedClaims message is multicast to the replicas of the object.

The invention distinguishes between an invoked-checkpoint thread, for which the checkpoint infrastructure invokes a get_thread_state( ) method of the thread to obtain the checkpoint of the thread, and a self-checkpointing thread, which itself determines the need to generate a checkpoint and to invoke the record_thread_state( ) method of the checkpoint infrastructure.

For each object, the checkpoint infrastructure maintains an objectCheckpointNmber that it increments when it initiates a new checkpoint of the object. The objectCheckpointNmber is written only by the checkpoint infrastructure, and is read by the threads of the object. Each thread maintains a threadCheckpointNumber corresponding to its most recently recorded checkpoint. Each mutex that protects shared data maintains a mutexCheckpointNumber corresponding to its most recently recorded checkpoint.

Each self-checkpointing thread compares its threadCheckpointNumber with the objectCheckpointNumber. If the threadCheckpointNumber is less than the objectCheckpointNumber, the thread generates a checkpoint.

When a thread invokes the CMT claim( ) function of a mutex, the CMT claim( ) function compares its mutexCheckpointNumber with the threadCheckpointNumber of the thread that is claiming the mutex. If the mutexCheckpointNumber is less than the threadCheckpointNumber, the CMT claim( ) function records a checkpoint for the shared data. If the mutexCheckpointNumber is greater than or equal to the threadCheckpointNumber, no checkpoint is required.

The invention employs a checkpoint data structure that allows a self-checkpointing thread to record data that are part of a checkpoint. The checkpoint data structure allows a self-checkpointing thread to restore the values of its local attributes and variables subsequently.

The checkpointing mechanisms of the invention avoid the "domino effect" that has hampered asynchronous checkpointing in the prior art, by recording the interactions between objects, threads and shared data in the checkpoint, so that those interactions can be replayed during restart.

Additionally, the present invention teaches how a source-code preprocessor tool can insert additional code into the source code of the application program to cause a self-checkpointing thread to record a checkpoint during normal operation and to restore the values of its attributes or variables subsequently. The source code is preferably added using a semi-automatic process in response to user feedback, although fully automatic operation can be provided for certain applications.

Unlike checkpoint mechanisms such as the progressive retry method which utilizes a central coordinator to obtain and restore globally consistent checkpoints across multiple processes within a distributed system, the present invention checkpoints multiple threads within a single process on a single computer, where that process might be replicated on multiple computers, rather than multiple different processes on different computers.

The present invention does not require that threads within an object, process or other component be stopped, as it allows a thread of an object, process or other component to continue executing while a different thread of that same object, process or other component on that same computer is being checkpointed.

Unlike mechanisms that require each process to take its own checkpoint and initiate its own restart, only self-checkpointing threads within the present invention take their own checkpoints.

Current forms of transparent checkpointing, such as those supporting asynchronous forked checkpointing, do not support the checkpointing of multithreaded processes as in the present invention.

The checkpointing library described for LinuxThreads does not work in the general case where threads within an object, process or other component share data with each other. In contrast, the mechanisms of the present invention checkpoint the local data of individual threads, as well as the data shared between threads, in an asynchronous manner.

An aspect of the invention is to provide checkpointing and restoration of the threads of objects, processes or other components of multithreaded application programs that are replicated using active replication.

Another aspect of the invention is that of providing fault tolerance within a computer system, or a network of computers, wherein continuous service is provided.

Another aspect of the invention is to provide checkpointing of threads within objects without blocking thread execution, or copying entire memory spaces.

Another aspect of the invention is to provide checkpointing that operates in the general case wherein processes on the same or different computers communicate with one another.

Another aspect of the invention is a checkpointing method in which separate checkpoints are generated for the local state of each thread and for the data shared between threads which are protected by mutexes or similar protection means.

Another aspect of the invention is a checkpointing method that allows different threads to be checkpointed at different times, while allowing restoration to a consistent state between replicas.

Another aspect of the invention is to provide checkpointing for threads and shared data for two kinds of data (state), private thread state and shared data.

Another aspect of the invention is to provide a checkpointing method that supports three kinds of threads: stateless threads, invoked-checkpoint threads and self-checkpointing threads.

Another aspect of the invention is to provide checkpointing and restoration that is implemented using wrapper functions associated with thread library calls, such as mutex claim( ) and release( ) functions.

Another aspect of the invention is the use of checkpoint numbering for objects, threads and mutexes for tracking when checkpoints are to be generated.

Another aspect of the invention is to provide checkpointing for self-checkpointing threads, which allows local attributes and variables to be checkpointed for later restoration.

A still further aspect of the invention is to provide incremental checkpointing of threads while the threads are executing.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The above and further advantages of the invention can be better understood by referring to the following description in conjunction with the accompanying drawings, in which.

DETAILED DESCRIPTION OF THE INVENTION

Figure 1:
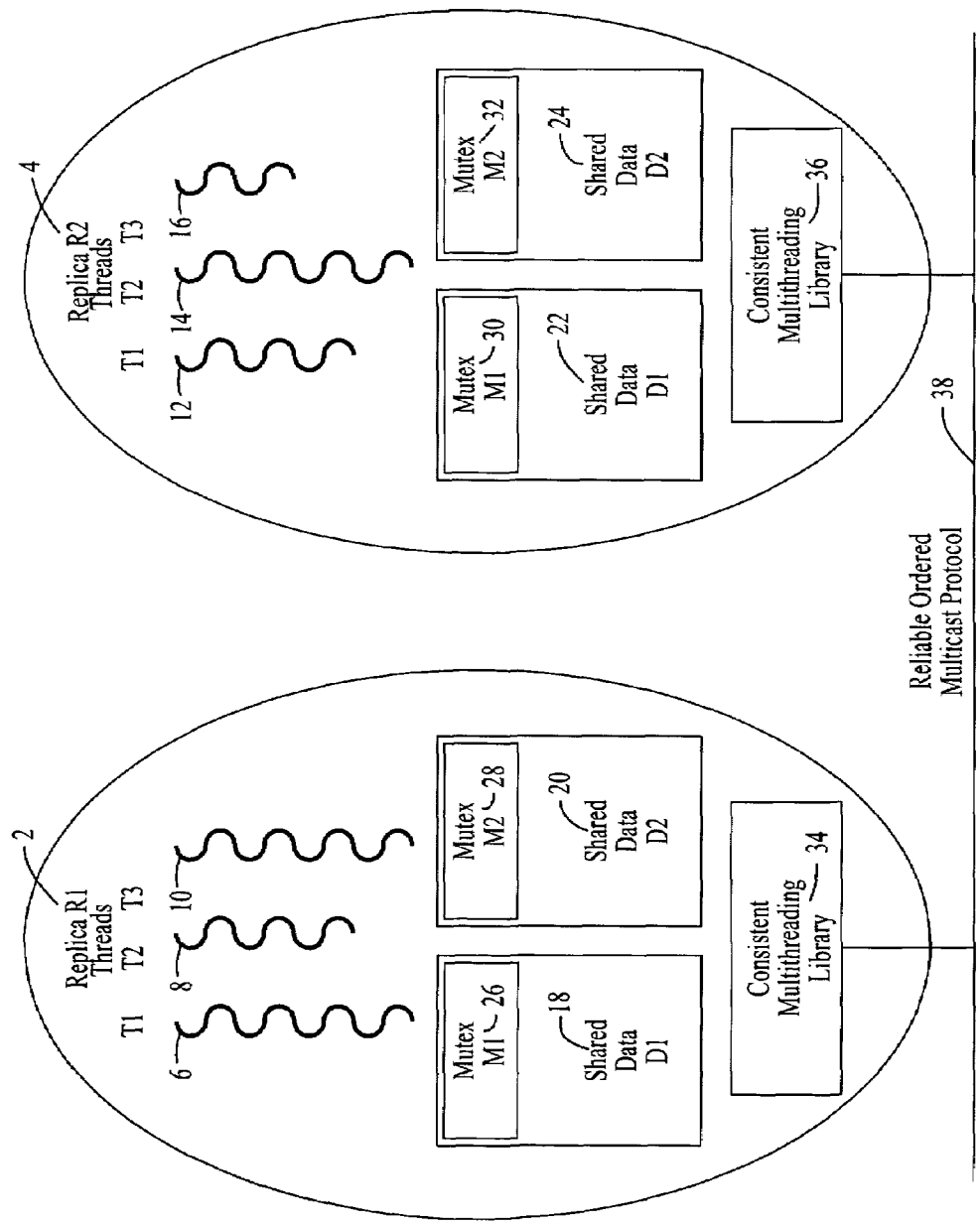
FIG. 1 is a diagram of two replicas of a server, replicated by active replication, according to an aspect of the present invention, shown in which each replica has multiple threads that share data.

The context in which this invention is described is a multithreaded application program that is distributed on multiple computers within a network of computers. The term "object" can be interpreted to mean an object, process or other component of the application program. In the preferred embodiment of the invention, the checkpoints are transmitted across the network and stored in the main memory of a remote computer, although they may be stored in the main memory of the local computer or written to a local or remote disk.

The objects of the application program are replicated for fault tolerance using the egalitarian and competitive active replication strategy, where all of the replicas have equal opportunity and where decisions about the order in which messages are processed and mutexes are granted is a competitive activity. The order established by the first replica processing a message or being granted a mutex is then followed by each other replica. For active replication, checkpointing is used to initialize a new or recovering replica from a checkpoint produced by an existing replica.

Although some of the diagrams below show only a single client, typically there will be more than one client. Moreover, the server replicas might also act as clients by invoking methods of other servers. The mechanisms of the present invention are unaffected by those extensions.

An application object may consist of more than two threads, or even of only a single thread, and may contain several mutexes that protect different shared data. The present invention, and the mechanisms described below, are unaffected by the number of threads or by the number of sets of shared data.

More elaborate mechanisms have been devised for providing exclusive access to shared data, including semaphores, monitors and rendezvous mechanisms. Such mechanisms operate according to the same goals and similar principles as mutexes, and it should be readily appreciated that the shared data protection means within the present invention can be readily extended beyond mutual exclusion constructs.

The mechanisms of the source-code preprocessor tool described in the present invention for the egalitarian and competitive active replication strategy apply also to the leader-follower semi-active and passive replication strategy.

In the preferred embodiment of this invention, for each object, the checkpoint infrastructure maintains a global variable, objectCheckpointNumber, which contains the checkpoint number of the most recent checkpoint that the checkpoint infrastructure has initiated for the object. The checkpoint number is preferably a monotonically increasing (or decreasing) value, wherein the relative order of checkpointing may be determined. Checkpoint numbering provides a means for synchronizing checkpointing of objects, threads, and mutexes based on detecting changes to the checkpoint number. It should be appreciated that the checkpoint number may be alternatively implemented with non-numeric values which provide for identifying the sequence of checkpoints. Each self-checkpointing thread maintains a local variable, threadCheckpointNumber, which contains the checkpoint number of the most recent checkpoint that the thread has recorded. When a thread is started, it initializes the threadCheckpointNumber to the value of the objectCheckpointNumber. Each mutex that protects shared data has a mutexCheckpointNumber.

Messages that are received after a checkpoint is taken are stored in a message log, so that they can be replayed to the new or recovering replica after the checkpoint is restored. The message log resides preferably in the main memory of the remote computer on which the new or recovering replica will be restored, although it may be stored in the main memory of the local computer or on a local or remote disk.

Checkpointing and Restoring Invoked-Checkpoint Threads

Each invoked-checkpoint thread provides get_thread_state( ) and set_thread_state( ) methods.

To take a checkpoint, the checkpoint infrastructure generates a request message that contains an invocation of the get_thread_state( ) method of the invoked-checkpoint thread. The get_thread_state( ) message is ordered, logged and delivered with other messages that contain method invocations. The reply to the get_thread_state( ) invocation contains the checkpoint data, and is logged with the other messages.

The manner in which the get_thread_state( ) method generates the checkpoint for the reply is application-dependent. Although a source-code preprocessor tool can be implemented for pre-processing the source code of the application program and generating source code for the get_thread_state( ) and set_thread_state( ) methods, that is not the preprocessor tool described in the present invention.

To restart an invoked-checkpoint thread from a checkpoint with a specific objectCheckpointNumber, first the checkpoint infrastructure locates, in the message log, the request and reply messages for the get_thread_state( ) invocation, for that particular objectCheckpointNumber. It removes, from the message log, each reply message for the get_thread_state( ) invocation and converts it into a request message that contains the set_thread_state( ) invocation. It replaces, in the message log, the reply message for the get_thread_state( ) invocation with the request message that contains the set_thread_state( ) invocation. The infrastructure then replays the message log to the new replica, commencing with the first message that contains the set_thread_state( ) invocation.

The parameter of the set_thread_state( ) method is the checkpoint returned when the checkpoint infrastructure invoked the get_thread_state( ) method. The set_thread_state( ) method assigns the value of the checkpoint to the attributes or variables of the thread.

Checkpointing and Restoring Self-Checkpointing Threads

Each self-checkpointing thread maintains a checkpoint data structure and a restoringCheckpoint flag, provides a restore_thread_state( ) method that is invoked by the checkpoint infrastructure and invokes a record_thread_state( ) of the checkpoint infrastructure.

Each self-checkpointing thread periodically checks the objectCheckpointNumber. If its threadCheckpointNumber is less than the objectCheckpointNumber, the thread invokes the record_thread_state( ) method of the checkpoint infrastructure to record its checkpoint. The checkpoint contains the current position of the thread in its flow of control, including the names of nested method invocations and their parameters and local variables.

To restart a self-checkpointing thread, the checkpoint infrastructure invokes the restore_thread_state( ) method of the thread. The restore_thread_state( ) method sets the local thread data to the values that were recorded for the checkpoint by the record_thread_state( ) method. The restore_thread_state( ) method sets the restoringCheckpoint flag and creates a checkpoint structure that is used to restore the values of other data. Execution of the thread is then started.

The invention also includes mechanisms that pre-process the source code of the self-checkpointing thread and assist the application programmer to insert, at appropriate points in the application program, code that checks the values of the restoringCheckpoint flag and the objectCheckpointNumber, that uses the checkpoint structure to record and restore the current position in the flow of control at the time of the checkpoint, including the names of nested method invocations and their parameters and local variables, before the execution of the thread is started. The self-checkpointing thread might need to access shared data and, thus, claim mutexes. The handling of those claims, and the setting of the shared data values, is the same as that described above for invoked-checkpoint threads.

Checkpointing and Restoring Shared Data

Shared data are preferably checkpointed, and restored, by the CMT claim( ) wrapper function of the mutex that protects the shared data, which is invoked by the threads that need to access the shared data.

If the mutexCheckpointNumber, held by the mutex for the shared data, is less than the threadCheckpointNumber, held by the thread for the last checkpoint that it recorded, then the most recent checkpoint of the shared data is not current and the CMT claim( ) function of the mutex invokes the get_shared_data( ) method to checkpoint the shared data. The infrastructure records the checkpoint for the shared data, along with the information about the order in which the mutex is granted to the thread, in GrantedClaims in a GrantedClaims message in the message log to ensure that the checkpoints are replayed in the same order as they were taken.

In addition, the checkpoint infrastructure checkpoints shared data that is not accessed by any of the threads in a timely manner. It regards such checkpointing as a low priority activity. The checkpoint infrastructure sequentially claims and immediately releases each of the mutexes that protect the shared data, thus ensuring that all of the shared data are checkpointed.

During the restart of a replica, which involves replay of the messages in the message log, the threads need to access shared data and claim the mutexes that protect the shared data. The GrantedClaims in the GrantedClaims messages in the message log determine the order in which the mutexes are granted to threads in the new or recovering replica. The CMT claim( ) wrapper function uses the checkpoints of the shared data in the GrantedClaims to assign values to the shared data as the mutexes are granted, while the messages in the log are being replayed. For a GrantedClaim without a checkpoint, the current values of the shared data continue to be used after the mutex is granted.

If a GrantedClaim for a mutex contains a checkpoint number that is less than the current mutexCheckpointNumber of that mutex, the CMT claim( ) function ignores the GrantedClaim. If a GrantedClaim for a mutex contains a checkpoint number that is equal to the current mutexCheckpointNumber of the mutex, the CMT claim( ) function does not invoke the set_shared_data( ) method to reset the shared data to the checkpoint but simply grants the mutex. If a GrantedClaim for a mutex contains a checkpoint number that is greater than the current mutexCheckpointNumber of the mutex, the CMT claim( ) function invokes the set_shared_data( ) method to reset the shared data to the value of the checkpoint and then grants the mutex.

Communication for Checkpointing and Restoring a Replicated Server

Referring more specifically to the drawings, for illustrative purposes the present invention is embodied in the apparatus generally shown in FIG. 1 through FIG. 20. It will be appreciated that the apparatus may vary as to configuration and as to details of the parts, and that the method may vary as to the specific steps and sequence, without departing from the basic concepts as disclosed herein.

In FIG. 1 there are two replicas, R1 2 and R2 4. In replica R1 there are three threads, T1 6, T2 8 and T3 10. Thread T1 and thread T2 access the data D1 18 that they share, using mutex M1 26. Thread T2 and thread T3 access the data D2 20 that they share, using mutex M2 28. The Consistent Multithreading (CMT) library 34 is interposed between replica R1 and the operating system thread library, and is linked into replica R1.

Similarly, in replica R2 there are three threads, T1 12, T2 14 and T3 16. Thread T1 and thread T2 access the data D1 22 that they share, using mutex M1 30. Thread T2 and thread T3 access the data D2 24 that they share, using mutex M2 32. The CMT library 36 is interposed between replica R2 and the operating system thread library, and is linked into replica R2.

In replica R1, because thread T1 and thread T2 can each read and write the data D1, their access to that data is protected by mutex M1 and, similarly, for thread T2 and thread T3. However, thread T1 shares no data with thread T3; thus, thread T1 can execute concurrently with thread T3 without the need for a mutex. The same is true for the threads in replica R2.

A multicast group communication protocol 38 conveys messages to replicas R1 and R2 and delivers the messages reliably and in the same order (linear sequence) to both of the replicas.

Checkpointing and Restoring Thread State

Figure 2:
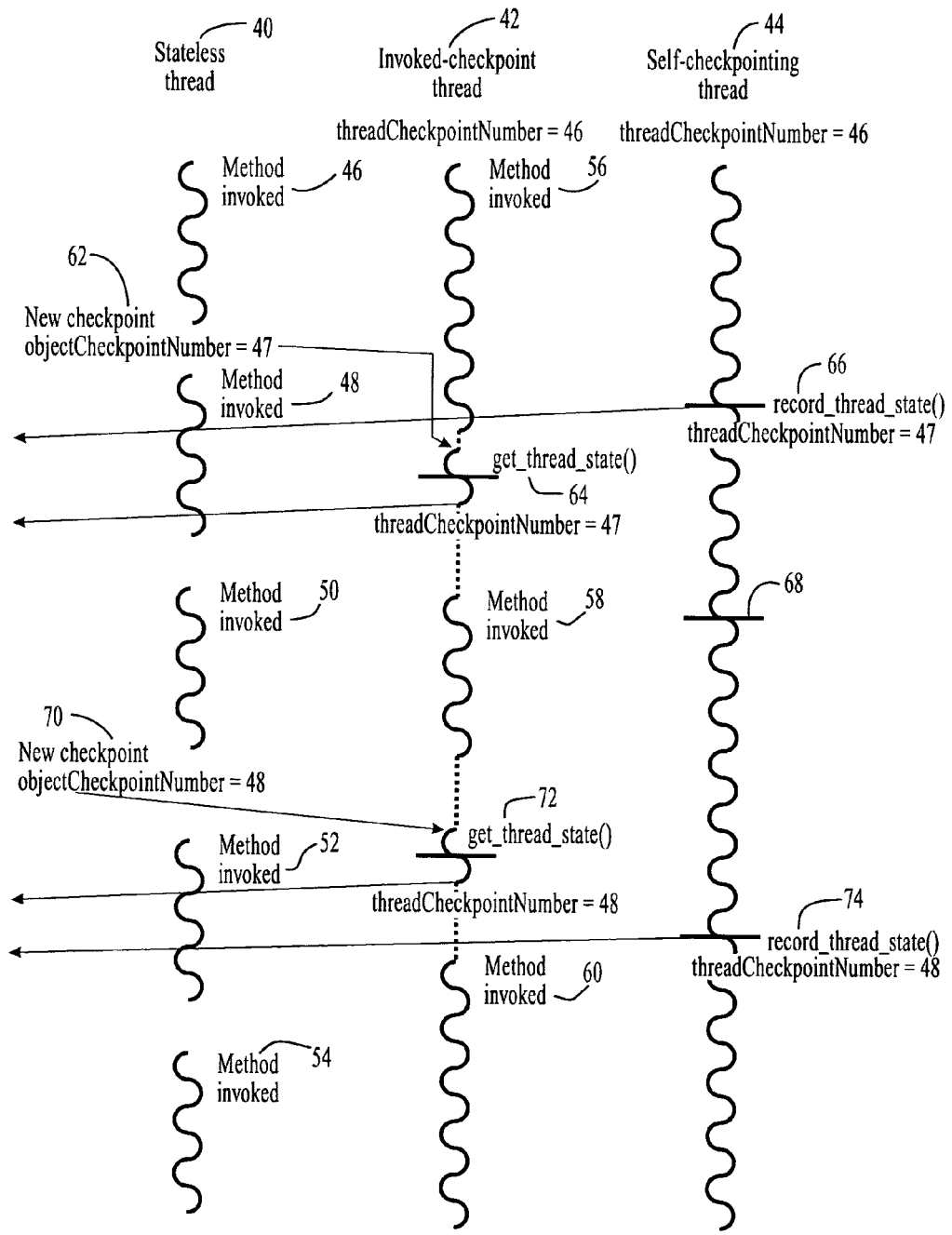
FIG. 2 is a diagram of a stateless thread, an invoked-checkpoint thread and a self-checkpointing thread according to an aspect of the present invention, showing the checkpointing of the invoked-checkpoint thread and the self-checkpointing thread at an existing active replica.

FIG. 2 shows a stateless thread 40, an invoked-checkpoint thread 42 and a self-checkpointing thread 44. Periodically, clients invoke methods that the stateless thread executes 46, 48, 50, 52 and 54. A stateless thread contains no state and, thus, is never checkpointed. Likewise, periodically, clients invoke methods that the invoked-checkpoint thread executes 56, 58 and 60. Between method invocations, the state is maintained within the invoked-checkpoint thread. The self-checkpointing thread operates continuously.

When a new checkpoint 62 is started with objectCheckpointNumber=47, the checkpoint infrastructure tries to invoke the get_thread_state( ) method 64 of the invoked-checkpoint thread; however, that thread is processing another method invocation. Consequently, the checkpoint infrastructure queues the get_thread_state( ) method invocation until the invoked-checkpoint thread completes the prior invocation. When the invoked-checkpoint thread completes the prior invocation, the checkpoint infrastructure invokes the get_thread_state( ) method 64 of the invoked-checkpoint thread, which returns the state of the thread. The infrastructure records the message containing the checkpoint in the message log, along with messages that contain other method invocations, so that the checkpoint is recorded at a specific position in the message sequence.

Meanwhile, the self-checkpointing thread checks the value of the objectCheckpointNumber, and determines that the checkpoint infrastructure has started a new checkpoint since the last checkpoint that it recorded. Consequently, the self-checkpointing thread invokes the record_thread_state( ) method 66 to record its state. When the self-checkpointing thread next checks 68 the value of the objectCheckpointNumber, it notes that the value of the objectCheckpointNumber is unchanged, indicating that the checkpoint infrastructure has not started another checkpoint in the meantime. Thus, the self-checkpointing thread does not invoke record_thread_state( ).

When it starts the next new checkpoint 70 with objectCheckpointNumber=48, the checkpoint infrastructure invokes the get_thread_state( ) method 72 of the invoked-checkpoint thread. Because the invoked-checkpoint thread is quiescent, it executes the method immediately and returns the state of the thread in the reply.

However, when the checkpoint infrastructure starts the new checkpoint, the self-checkpointing thread is processing. The self-checkpointing thread does not check the value of the objectCheckpointNumber until a later time. At that time, it determines that the objectCheckpointNumber has increased since the last checkpoint that it recorded and, thus, that the checkpoint infrastructure has started a new checkpoint. Consequently, the self-checkpointing thread invokes the record_thread_state( ) method 74 to record its state.

Restarting from a Checkpoint

Figure 3:
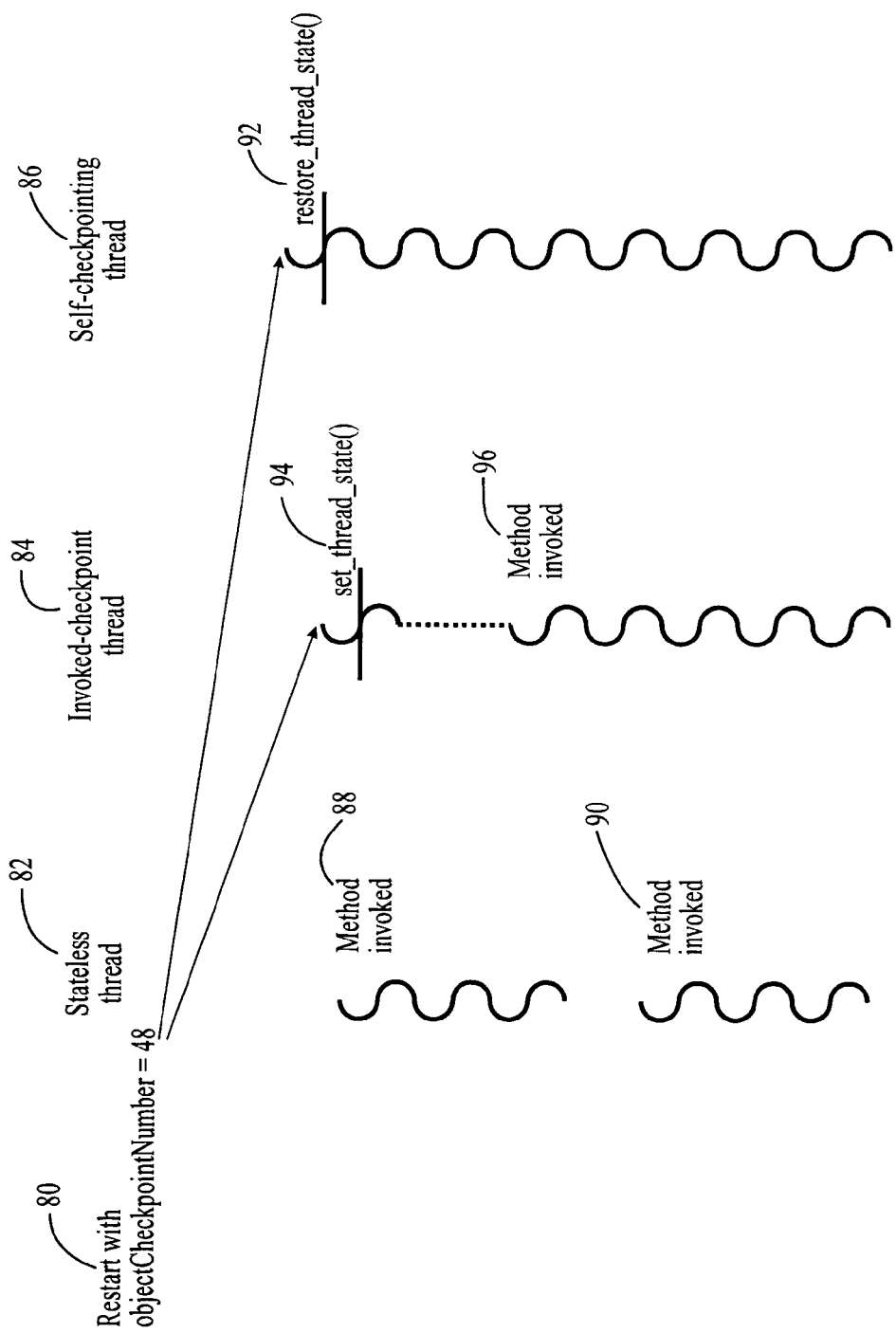
FIG. 3 is a diagram of a stateless thread, an invoked-checkpoint thread and a self-checkpointing thread according to an aspect of the present invention, showing the restoration of the state of the invoked-checkpoint thread and the self-checkpointing thread, on starting a new active replica or recovering an existing active replica.

FIG. 3 shows a restart 80 from a checkpoint with objectCheckpointNumber=48. The stateless thread 82, the invoked-checkpoint thread 84 and the self-checkpointing thread 86 are created. The stateless thread requires no state restoration. Consequently, a stateless thread can process a client's method invocation as soon as it receives them 88, 90. The checkpoint infrastructure invokes the restore_thread_state( ) method 92 of the self-checkpointing thread, supplying it with the state that it recorded for the checkpoint (76 of FIG. 2). The self-checkpointing thread resumes processing immediately from the state set by the restore_thread_state( ) method. The checkpoint infrastructure also invokes the set_thread_state( ) method 94 of the invoked-checkpoint thread, supplying it the state that it recorded for the checkpoint (74 of FIG. 2). The invoked-checkpoint thread then awaits the next method invocation 96 from the client, or from replaying the messages in the message log until the log becomes empty.

Checkpointing Shared Data Accessed by a Single Thread

Figure 4:
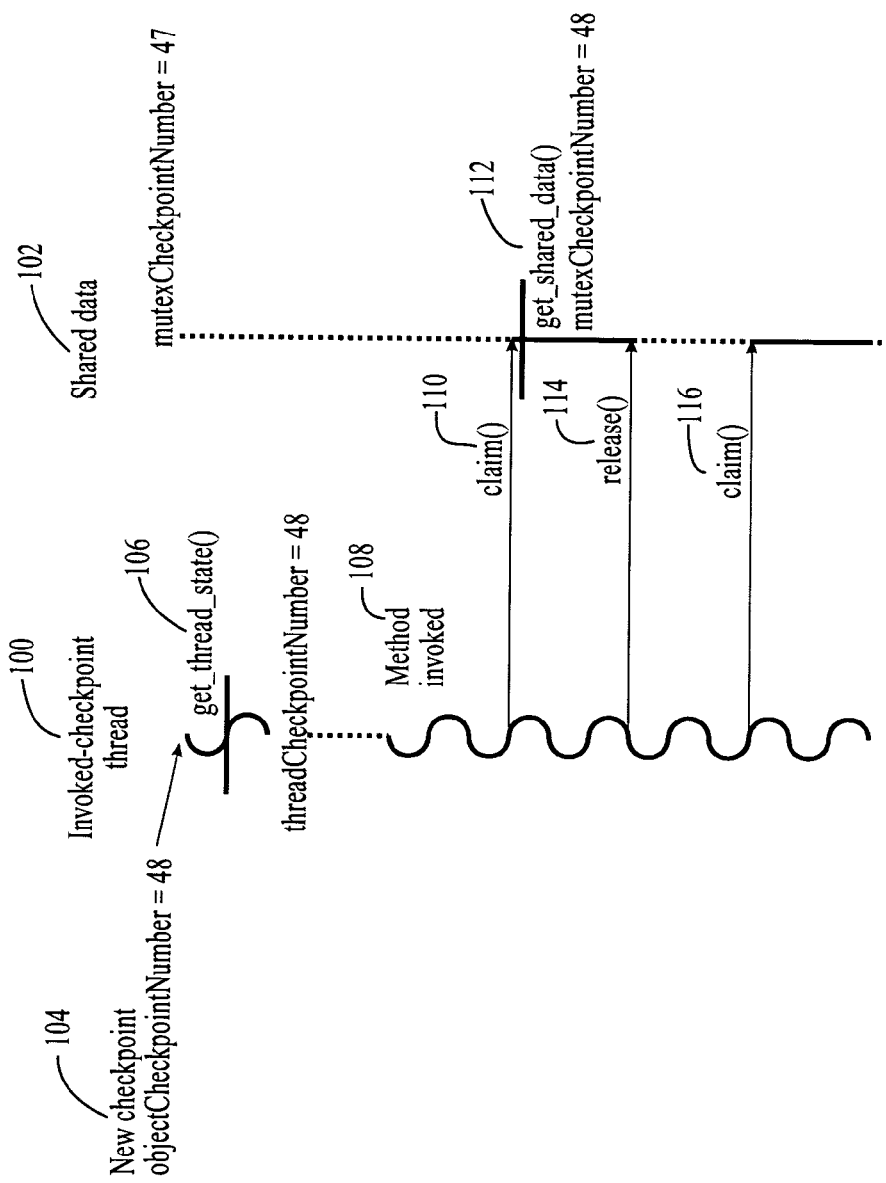
FIG. 4 is a diagram of checkpointing for shared data according to an aspect of the present invention, shown accessed by a single thread for an existing active replica.

In FIG. 4 an invoked-checkpoint thread 100 of an existing active replica accesses shared data 102. The checkpoint infrastructure starts a new checkpoint 104 with objectCheckpointNumber=48, and invokes the get_thread_state( ) method 106 of the invoked-checkpoint thread to obtain the state of that thread for the checkpoint. A client invokes a method 108 that the invoked-checkpoint thread processes. Subsequently, the thread needs to access shared data and, thus, claims 110 the mutex for that shared data. The CMT claim( ) wrapper function determines that the mutexCheckpointNumber=47, held by the mutex for the shared data, is less than the threadCheckpointNumber=48, held by the thread for the checkpoint that it last recorded. Consequently, the CMT claim( ) function invokes the get_shared_data( ) method 112 to checkpoint the shared data. The infrastructure records the Granted Claims containing the checkpoint of the shared data in a GrantedClaims message in the message log to ensure that the checkpoints are replayed in the same order as they were taken. Subsequently, the thread finishes accessing the shared data and, thus, invokes the CMT release( ) function 114 of the mutex. Subsequently, the thread needs to access the shared data and, thus, invokes the CMT claim( ) function 116 of the mutex. The CMT claim( ) function determines that the threadCheckpointNumber=48, held by the thread, is equal to the mutexCheckpointNumber=48, held by the mutex for the shared data. Consequently, there is no need to checkpoint the shared data.

Restoring Shared Data Accessed by a Single Thread

Figure 5:
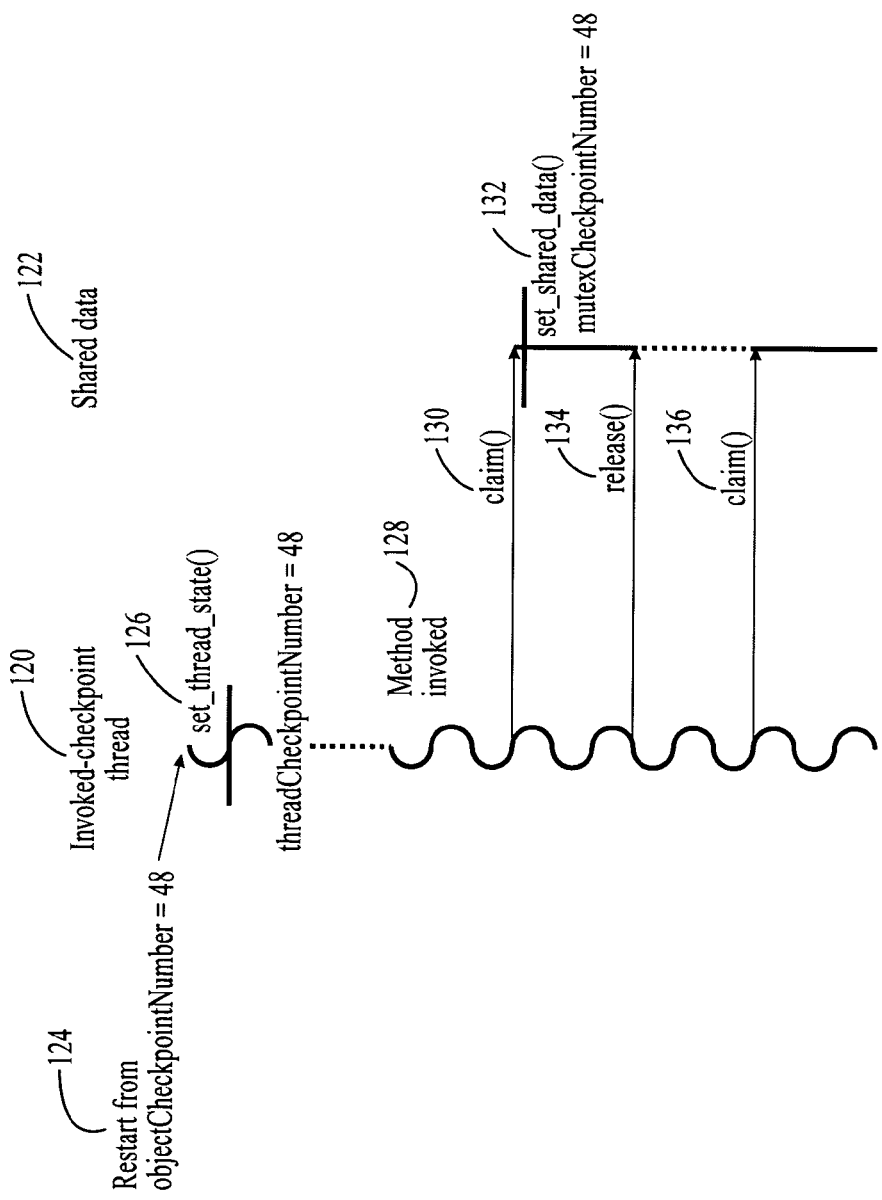
FIG. 5 is a diagram of restoring shared data according to an aspect of the present invention, shown accessed by a single thread at a new or recovering active replica.

In FIG. 5 an invoked-checkpoint thread 120 of a new replica that accesses shared data 122 is started from the checkpoint that was previously recorded (at 112 in FIG. 4). When the checkpoint infrastructure restarts 124 from the checkpoint with objectCheckpointNumber=48, it invokes the set_thread_state( ) method 126 of the invoked-checkpoint thread. The set_thread_state( ) method restores the values of the local variables of the invoked-checkpoint thread, but does not restore the values of the variables of the shared data. Subsequently, during the replay of the messages in the message log, a client invokes a method 128 that is processed by the thread.

When the thread of the new replica needs to access the shared data, it invokes the CMT claim( ) function 130 of the mutex that protects the shared data. The mutex is granted according to GrantedClaims recorded in GrantedClaims messages in the message log to ensure that the mutex is granted to the threads in the same order as it was granted during the original processing. In this case, the CMT claim( ) function recorded a checkpoint during the original processing (112 in FIG. 4). During restoration of the new replica, the checkpoint infrastructure finds the checkpoint for the shared data in a GrantedClaim in a GrantedClaims message in the message log and passes the checkpoint to the CMT claim( ) function, which invokes the set_shared_data( ) method 132 that sets the values of the shared data using the checkpoint. The thread finishes accessing the shared data and then invokes the CMT release( ) function 134 of the mutex. Subsequently, the thread needs to access the shared data and invokes the CMT claim( ) function 136 of the mutex. The GrantedClaim in the GrantedClaims message in the message log that grants the mutex to the thread contains no checkpoint data. Consequently, the thread uses the existing values of the shared data.

Checkpointing Shared Data Accessed by Multiple Threads

Figure 6:
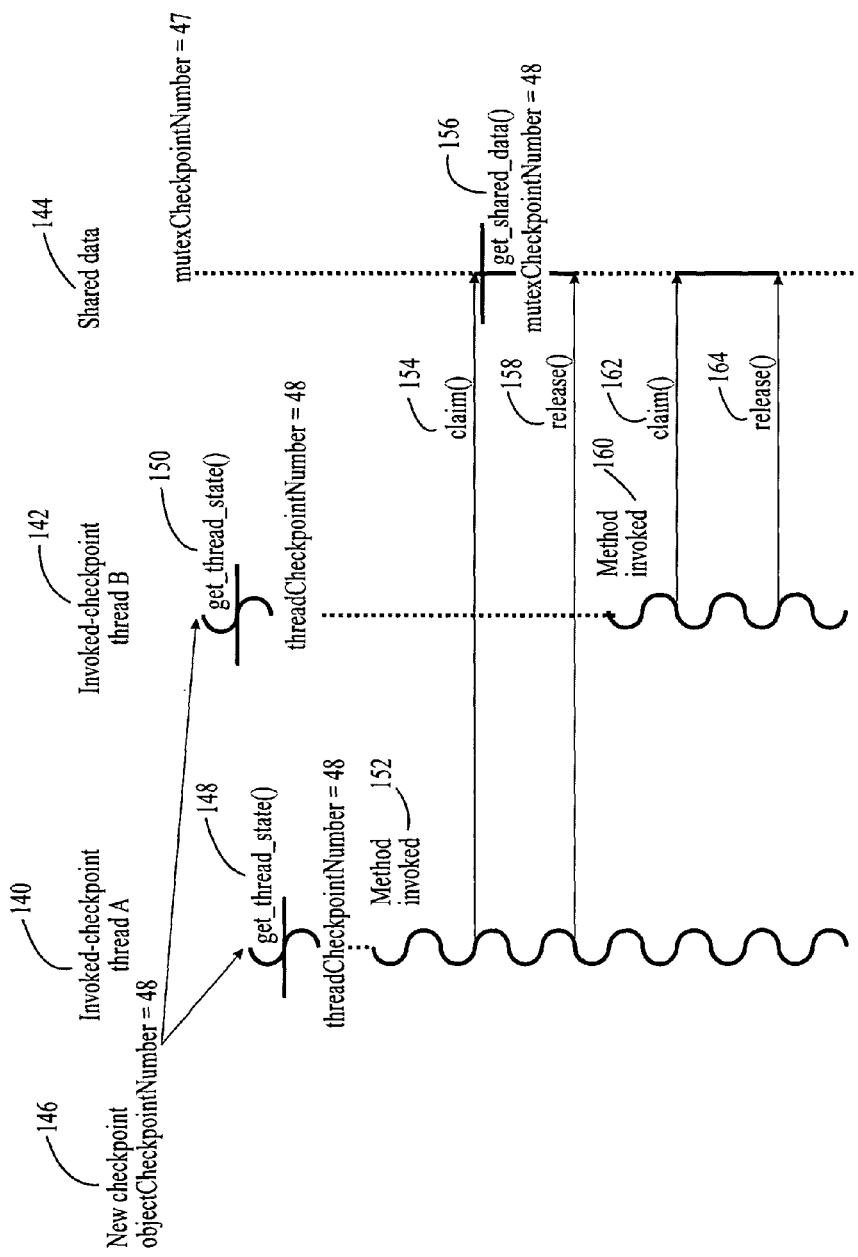
FIG. 6 is a diagram of checkpointing of shared data according to an aspect of the present invention, shown accessed by multiple threads at an existing active replica.

In FIG. 6 two invoked-checkpoint threads, thread A 140 and thread B 142, share data 144. When a new checkpoint 146 with objectCheckpointNumber=48 is started, the checkpoint infrastructure invokes the get_thread_state( ) methods 148, 150 of both threads to obtain their states for the checkpoint. Both threads record the same threadCheckpoint- Number=48, although not necessarily at exactly the same time. A client then invokes a method 152 that is processed by thread A. Because thread A needs to access the shared data, it invokes the CMT claim( ) function 154 of the mutex. The CMT claim( ) function determines that the mutex-CheckpointNumber=47, held by the mutex for the shared data, is less than the threadCheckpointNumber=48, held by thread A for the last checkpoint that it recorded. Consequently, the CMT claim( ) function invokes the get_shared_data( ) method 156 to checkpoint the shared data. Subsequently, thread A finishes accessing the shared data and then invokes the CMT release( ) function 158 of the mutex.

Later, a client invokes a method 160 that is processed by thread B, and thread B needs to access the shared data and invokes the CMT claim( ) function 162 of the mutex and, subsequently, the CMT release( ) function 164 of the mutex. The CMT claim( ) function determines that the threadCheckpointNumber=48, held by thread B, is equal to the mutexCheckpointNumber=48, held by the mutex for the shared data. Consequently, there is no need to checkpoint the shared data.

Restoring Shared Data Accessed by Multiple Threads

Figure 7:
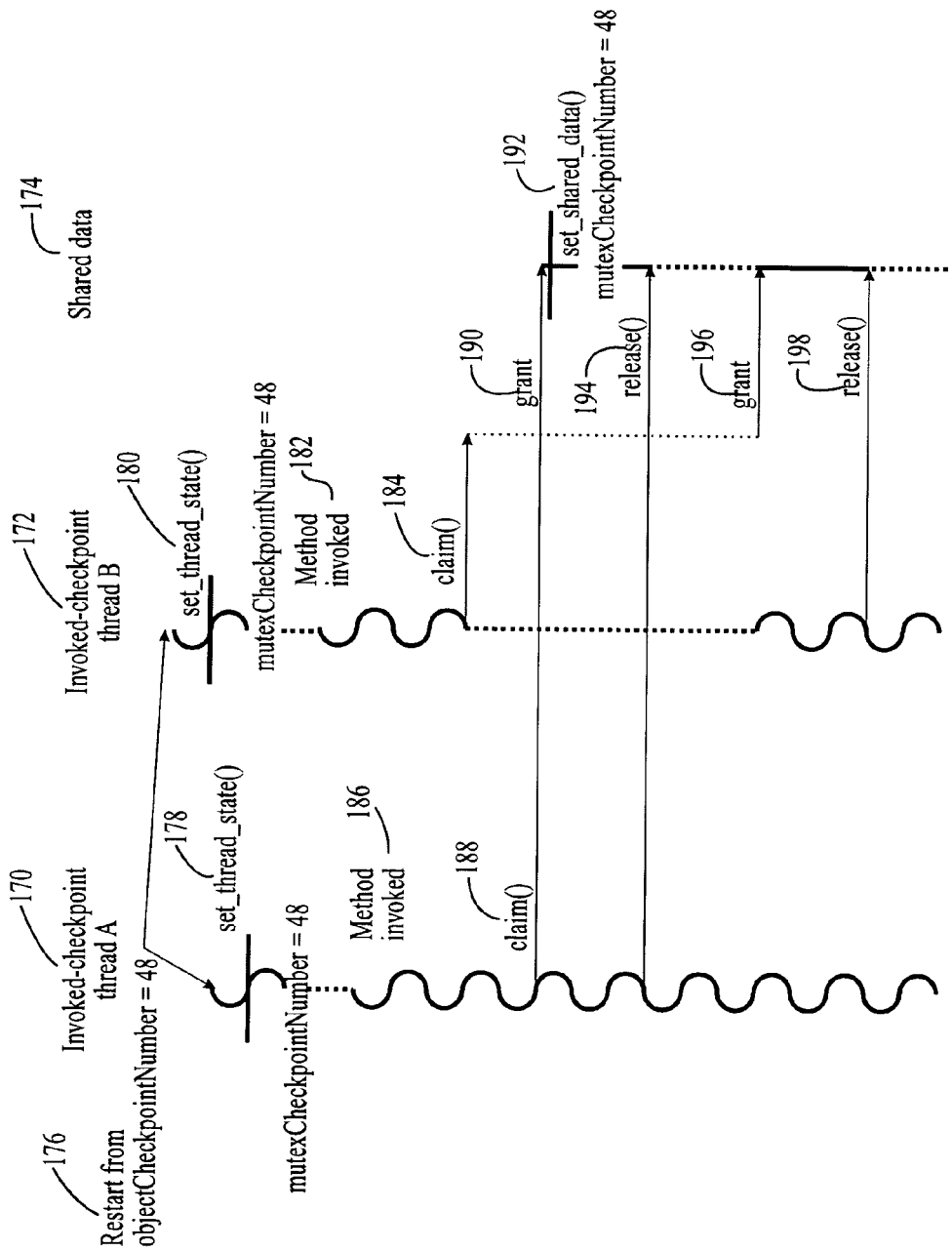
FIG. 7 is a diagram of restoring shared data according to an aspect of the present invention, shown accessed by multiple threads at a new or recovering active replica.

FIG. 7 shows a restart from the checkpoint recorded in FIG. 6, again for thread A 170, thread B 172 and the shared data 174. When the checkpoint infrastructure restarts 176 the object from the checkpoint with objectCheckpointNumber=48, it invokes the set_thread_state( ) method 178 of thread A and the set_thread_state( ) method 180 of thread B.

The infrastructure then replays the messages from the message log. It cannot be guaranteed that the replay of messages from the message log results in the same relative timing of the processing of the threads as the original processing. The infrastructure allows such differences in timing while maintaining strong replica consistency.

In FIG. 7 thread B starts processing a method 182 invoked by a client earlier than is shown at 160 in FIG. 6, using its local state, which was set by the set_thread_state( ) method 180. Soon after, thread B needs to access the shared data and invokes the CMT claim( ) function 184 of the mutex before thread A does so. If thread B were allowed to access the shared data at this time, it would obtain incorrect data because, in the original execution shown in FIG. 6, thread B used values of the shared data after thread A had accessed that shared data. However, the CMT claim( ) function, based on the order of the GrantedClaims in the GrantedClaims messages in the message log, determines that thread A must be granted its claim to the mutex to access the shared data before thread B does so. Consequently, it suspends thread B until thread A has finished accessing the shared data.

Subsequently, a client invokes a method 186 that is processed by thread A. When thread A needs to access the shared data, it invokes the CMT claim( ) function 188 of the mutex for the shared data. The claim of thread A is granted before the claim of thread B, as directed by the order of the GrantedClaims in the GrantedClaims messages in the message log. The GrantedClaim in the GrantedClaims message in the message log contains the checkpoint that the CMT claim( ) function recorded during the original processing (156 in FIG. 6). The CMT claim( ) function grants 190 the mutex to thread A, and invokes the set_shared_data( ) method, which sets the values of the shared data using the checkpoint, as described in more detail in FIG. 18. Thus, the shared data that thread A accesses has the same values that it had during the original processing. Subsequently, thread A finishes accessing the shared data and invokes the CMT release( ) function 194 of the mutex.

The release of the mutex by thread A allows the suspended thread B to resume and to be granted 196 the mutex for the shared data. Thus, thread B accesses the correct values of the shared data, values that were restored from the checkpoint and then manipulated by thread A. Subsequently, thread B finishes accessing the shared data and, then, invokes the CMT release( ) function 198 of the mutex.

Figure 8:
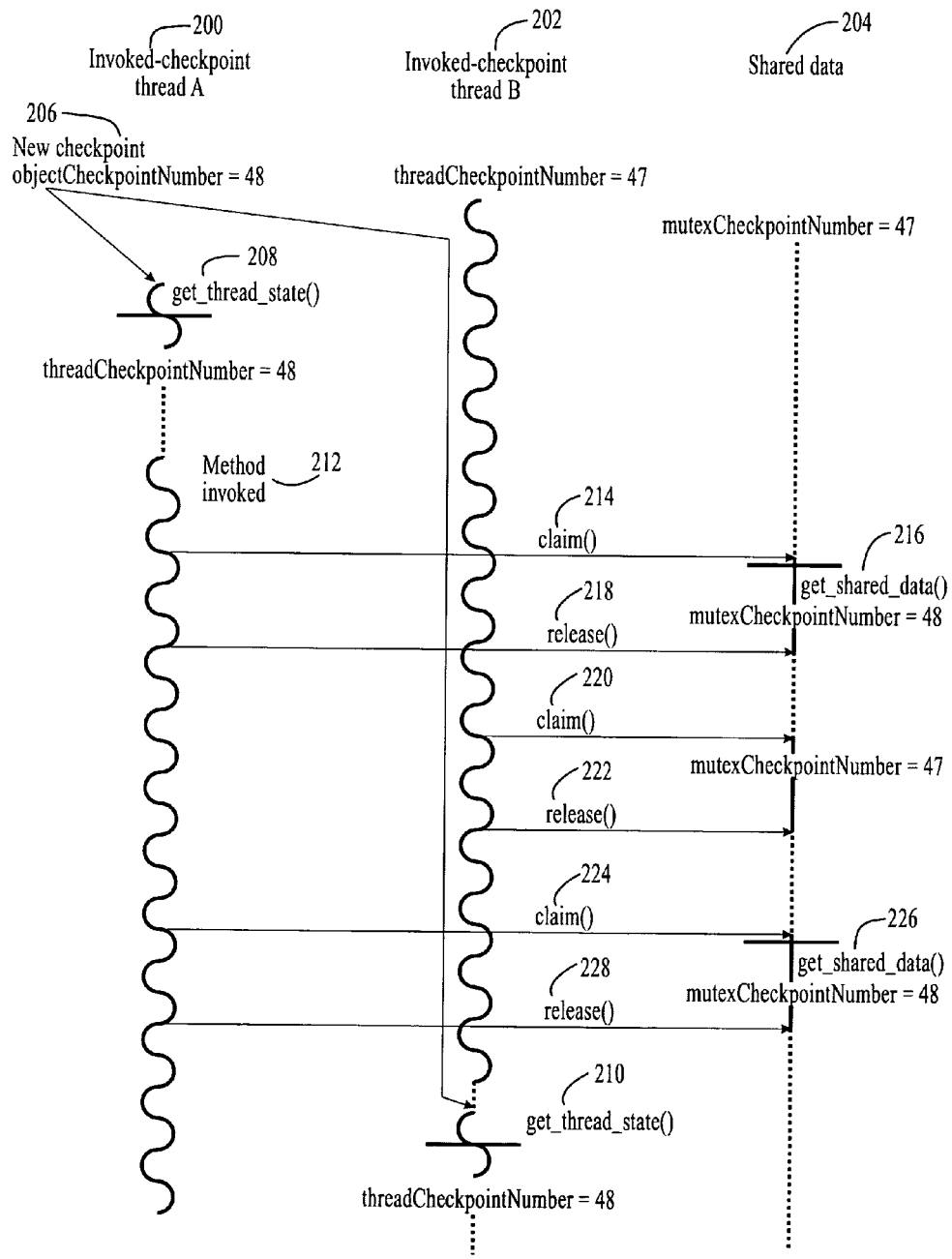
FIG. 8 is a diagram of checkpointing shared data according to an aspect of the present invention, shown accessed by a thread with a threadCheckpointNumber that is less than the mutexCheckpointNumber of the mutex that protects the shared data at an existing active replica.

Checkpointing Shared Data Accessed by a Thread with
threadCheckpointNumber<mutexCheckpointNumber FIG. 8 shows two invoked-checkpoint threads, thread A 200 and thread B 202, that share data 204. When the checkpoint infrastructure starts to take a new checkpoint 206, with objectCheckpointNumber=48, it invokes the get_thread_state( ) methods 208, 210 of both threads to obtain their states for the checkpoint. Thread A processes the invocation of get_thread_state( ) immediately, and records threadCheckpointNumber=48. Thread B, however, is processing a prior method invocation and cannot process the invocation of get_thread_state( ) until later. Instead, thread B continues to process its prior invocation, with threadCheckpointNumber=47, the checkpoint number for which it last recorded a checkpoint.

Next, a client invokes a method 212 that is processed by thread A. Because thread A needs to access the shared data, it invokes the CMT claim( ) function 214 of the mutex. The CMT claim( ) function determines that the mutexCheckpointNumber=47, held by the mutex of the shared data, is less than the threadCheckpointNumber=48, held by thread A for the last checkpoint that it recorded. Consequently, the CMT claim( ) function invokes the get_shared_data( ) method 216 to checkpoint the state of the shared data. Subsequently, thread A finishes accessing the shared data and then invokes the CMT release( ) function 218 of the mutex.

Meanwhile, thread B needs to access the shared data and invokes the CMT claim( ) function 220 of the mutex and, subsequently, the CMT release( ) function 222 of the mutex. The CMT claim( ) function determines that the threadCheckpointNumber=47, held by thread B, is less than the mutexCheckpointNumber=48, held by the mutex for the shared data. Consequently, there is no need to checkpoint the shared data. However, the CMT claim( ) function resets mutexCheckpointNumber=47 for the shared data.

Shortly after, thread A again needs to access the shared data and invokes the CMT claim( ) function 224 of the mutex, and later the CMT release( ) function 228 of the mutex. The CMT claim( ) function determines that the mutexCheckpointNumber=47, held by the mutex for the shared data, is less than the threadCheckpointNumber=48, held by thread A. Consequently, the CMT claim( ) function invokes the get_shared_data( ) method 226 to checkpoint the state of the shared data and sets the mutexCheckpointNumber to the threadCheckpointNumber=48 of thread A.

Figure 9:
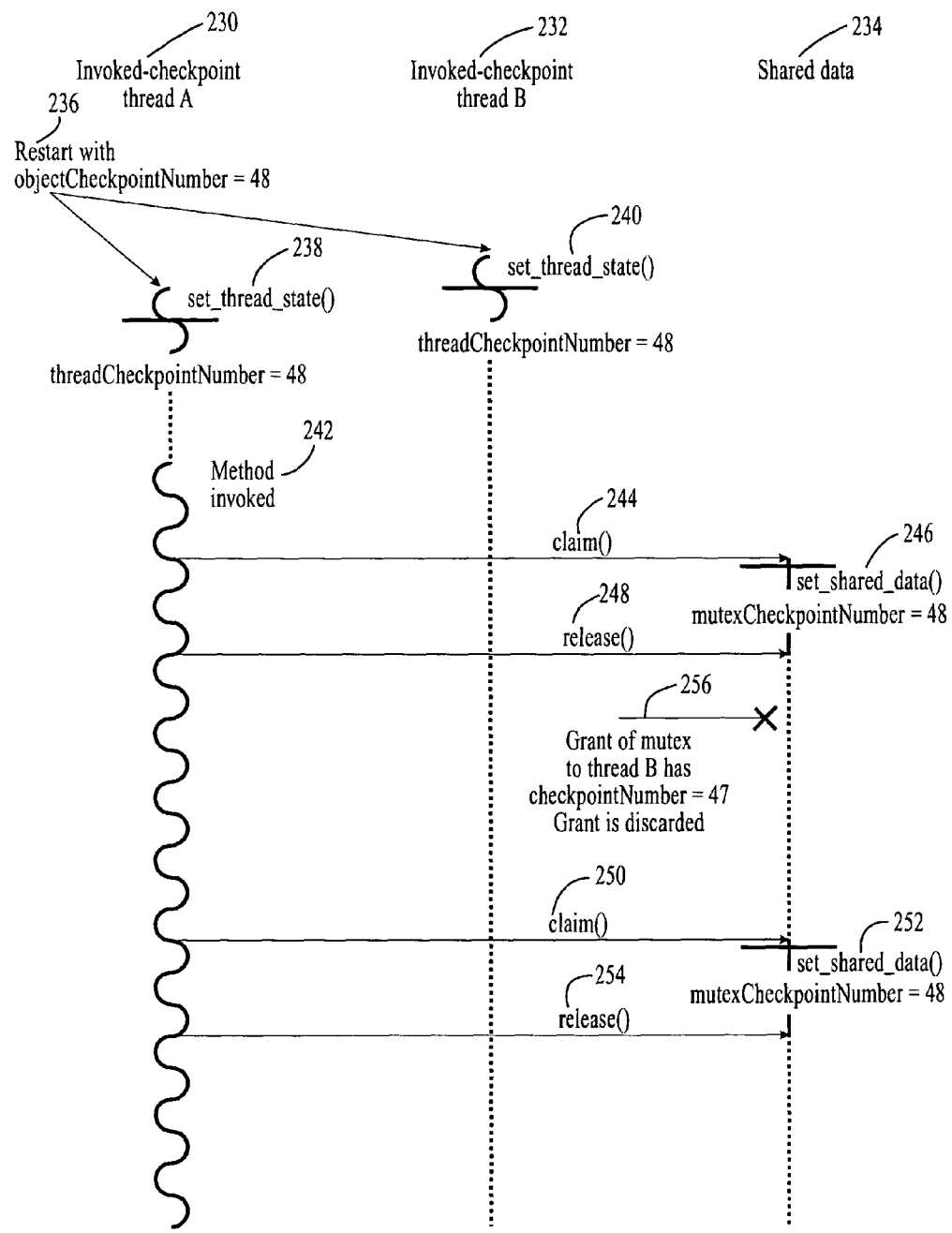
FIG. 9 is a diagram of restoring shared data according to an aspect of the present invention, shown accessed by a thread with a threadCheckpointNumber that is less than the mutexCheckpointNumber of the mutex that protects the shared data at a new or recovering active replica.

Restoring Shared Data Accessed by a Thread with
threadCheckpointNumber<mutexCheckpointNumber FIG. 9 shows a restart from the checkpoint recorded in FIG. 8, again for thread A 230, thread B 232 and the shared data 234. When the checkpoint infrastructure restarts 236 the object from the checkpoint with objectCheckpointNumber=48, it invokes the set_thread_state( ) method 238, 240 of threads A and B. Those invocations restore the states that were recorded by the invocations of the get_thread_state( ) method of threads A and B (208, 210 in FIG. 8). The infrastructure replays messages from the message log. In FIG. 8 thread B was processing a prior method invocation with threadCheckpointNumber=47. That processing is not repeated here during the restart of thread B for threadCheckpointNumber=48. The message log does not contain any invocation for thread B until later; however, it does contain a method invocation 242 for thread A.

During the restart and reply of the message log, when that method 242 is invoked, thread A invokes the CMT claim( ) function 244 of the mutex for the shared data. During the original processing in FIG. 8, the CMT claim( ) function included a checkpoint for the shared data in a GrantedClaim in a GrantedClaims message in the message log (216 in FIG. 8). During the replay of messages from the message log, the CMT claim( ) function finds the checkpoint for the shared data in the GrantedClaim, and invokes the set_shared_data( ) method 246 that sets the values of the shared data using the checkpoint, as described in more detail in FIG. 16. Thus, thread A processes shared data that have the same values as that data had during the original processing. When thread A finishes accessing the shared data, it invokes the CMT release( ) function 248 of the mutex.

Subsequently, thread A again invokes the CMT claim( ) function 250 of the mutex for the shared data. During the original processing, the CMT claim( ) function included a checkpoint in a GrantedClaim in a GrantedClaims message in the message log (226 in FIG. 8). During the replay of messages from the message log, the CMT claim( ) function finds the checkpoint in the GrantedClaim, and invokes the set_shared_data( ) method 252 that sets the values of the shared data using the checkpoint. Thus, thread A processes shared data that have the same values as that data had during the original processing, data that thread B had modified (220 in FIG. 8), even though thread B is not performing that processing during the restart. When thread A finishes accessing the shared data, it invokes the CMT release( ) function 254 of the mutex.

During the replay of the message log, the CMT claim( ) function finds, between the two GrantedClaims described above, a third GrantedClaim that claims the mutex for the shared data for thread B 256, corresponding to the claim 220 in FIG. 8. In that GrantedClaim, the checkpoint number=47, which is less than the current threadCheckpointNumber=48 of thread B; consequently, the CMT claim( ) function determines that the claim of the mutex for thread B is obsolete and discards that GrantedClaim.

Communication of Checkpoint Information

Figure 10:
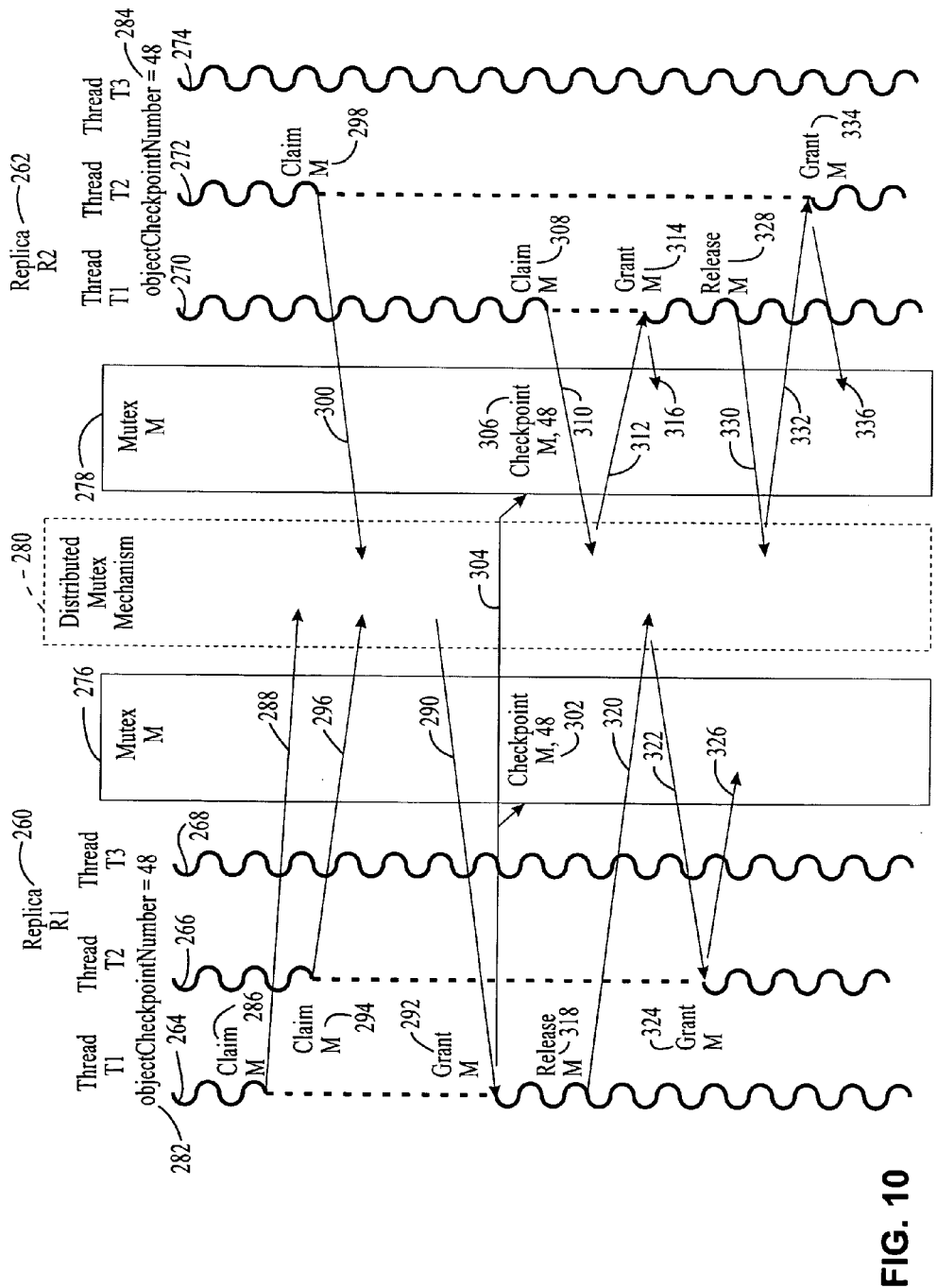
FIG. 10 is a diagram of shared data operations according to an aspect of the present invention, showing claiming the mutex that protects shared data, the granting of the mutex for the shared data and the recording of a checkpoint for the shared data at an existing active replica.

FIG. 10 shows two replicas R1260 and R2 262, using active replication. Each of the two replicas has three threads, T1 264, T2 266 and T3 268 in replica R1, and T1 270, T2 272 and T3 274 in replica R2. The threads in replica R1 share data that are protected by mutex M 276 and, correspondingly, the threads in replica R2 share data that are protected by mutex M 278.

In FIG. 10 checkpoints 282 and 284, with objectCheckpointNumber=48, have been initiated in each of the replicas. Thread T1 in replica R1 claims 286 mutex M and passes 288 that claim to the distributed mutex mechanism, which responds 290 to replica R1 that M is granted to T1 292. Shortly after, thread T2 in replica R1 claims 294 mutex M and passes 296 that claim to the distributed mutex mechanism. That claim cannot be granted to thread T2 in replica R1, because mutex M is already granted to thread T1. Then, thread T2 in replica R2 claims 298 mutex M and passes 300 that claim to the distributed mutex mechanism. That claim cannot be granted to thread T2 in replica R2, because mutex M is already granted 292 to thread T1 in replica R1, and must be granted to thread T1 in replica R2 before it can be granted to thread T2 in replica R2.

As M is granted to thread T1 in replica R1 292, the CMT claim( ) function determines that the shared data protected by M must be checkpointed. At replica R1, the checkpoint 302 of the shared data is included in a GrantedClaim in a GrantedClaims message. The GrantedClaims message is communicated 304 to both replicas R1 and R2, where it is recorded in the M.grantedClaims queue 306.

Thread T1 in replica R2 claims 308 mutex M and passes 310 the claim to the distributed mutex mechanism, which responds 312 to replica R2 that M is granted to T1. On granting mutex M to thread T1 314, the CMT claim( ) function determines 316 that a checkpoint of the shared data is needed, but also that the checkpoint has already been created and multicast by replica R1. Consequently, the CMT claim( ) function does not repeat the creation and multicasting of a GrantedClaims message containing the checkpoint.

Thread T1 in replica R1 releases 318 mutex M and passes 320 the release to the distributed mutex mechanism, which responds 322 to replica R1 that thread T2 is granted 324 its claim to mutex M. The CMT claim( ) function determines 326 that a checkpoint of the shared data is not needed, because the checkpoint had already been created and multicast when the mutex was granted to thread T1.

Similarly, thread T1 in replica R2 releases 328 mutex M, and passes 330 the release to the distributed mutex mechanism, which responds 332 to replica R2 that thread T2 is granted 334 its claim to mutex M. The CMT claim( ) function determines 336 that no checkpoint of the shared data is needed, because the checkpoint has already been created and multicast when the mutex was granted to thread T1 in replica R1.

Checkpointing and Restoration Algorithms

When a thread of an active replica is granted a claim for a mutex, the CMT claim( ) wrapper function inserts mutex ordering, granting and checkpointing information into a GrantedClaim in a GrantedClaims message, and communicates that message to the replicas, including the new or recovering replica. The new or recovering replica stores the information in a grantedClaims queue for that mutex. The information determines the order in which the mutex is granted to the threads, and includes the checkpointed values of the shared data.

The checkpointing algorithms make reference to a thread T, a mutex M, a 4-tuple (T, N, C, X) and a 5-tuple (T, M, N, C, X). N is obtained from T.N, which represents the Nth attempt of thread T to claim any mutex. C is obtained from T.C, which represents the threadCheckpointNumber of the most recent checkpoint for thread T. X represents the checkpoint of the shared data.

Active Replica Thread Invokes the CMT Claim( ) Function to Claim a Mutex

At an active replica, when thread T invokes the CMT claim( ) function to claim mutex M, as its T.Nth claim to any mutex, the CMT claim( ) function executes the following steps:

```
if M can be granted to T immediately
    grant M to T
    if T.N > T.L
        if T.C > M.C
            X = M.get_shared_data( )
                create GrantedClaim (T, M, T.N, T.C, X)
                multicast GrantedClaims message to replicas
            else
                create GrantedClaim (T, M, T.N, T.C, —)
                multicast GrantedClaims message to replicas
        else { }    // checkpoint is already received
        M.C = T.C
        T.N = T.N + 1
    else
        request M for T from distributed mutex mechanism
        suspend T
```

Figure 11:
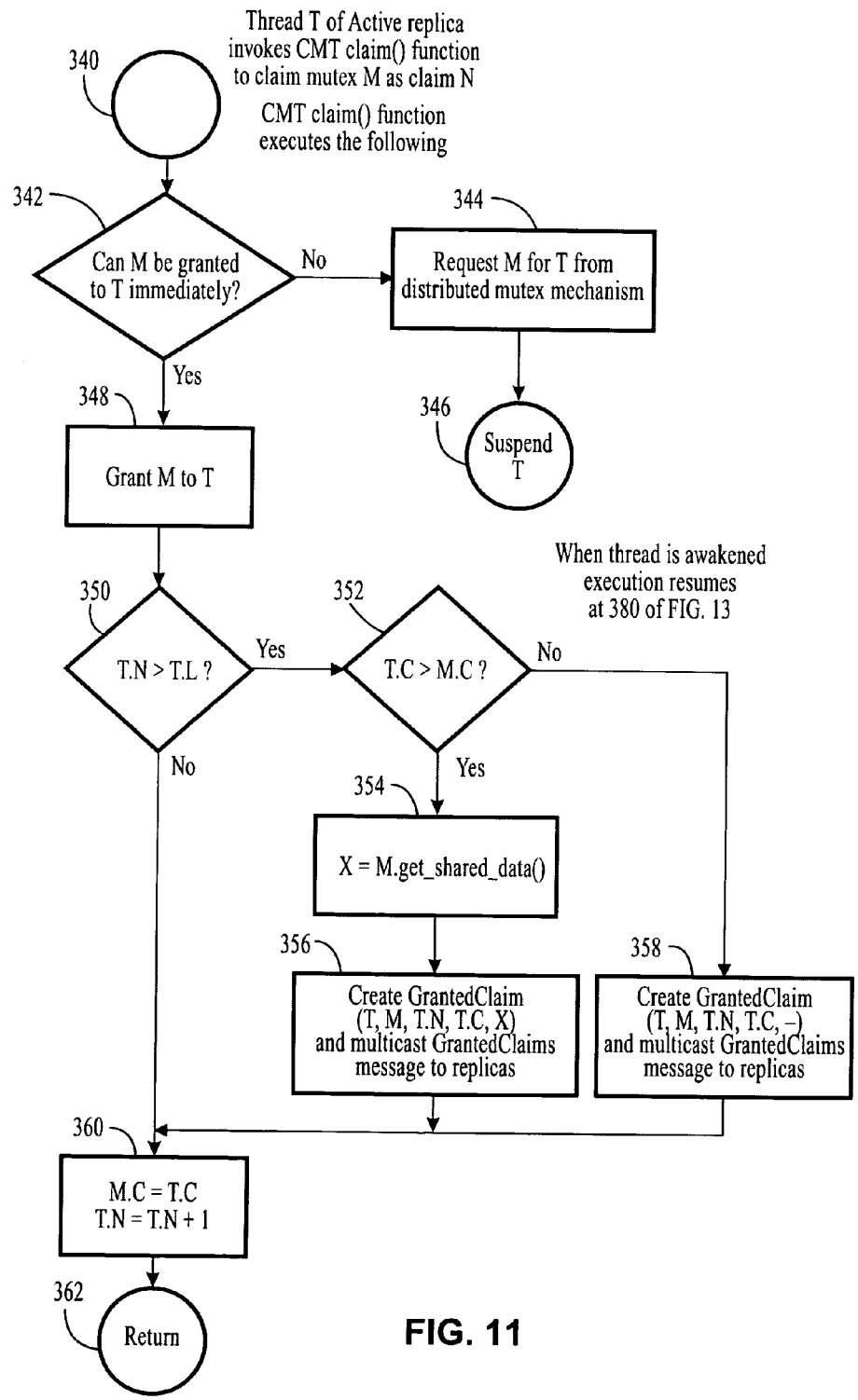
FIG. 11 is a flowchart of a thread of an active replica invoking the CMT claim( ) function for a mutex according to an aspect of the present invention, shown executing steps taken by the CMT claim( ) function.

Thus, as shown in FIG. 11, at an active replica, when thread T invokes the CMT claim( ) function 340 for mutex M as its T.Nth claim, the CMT claim( ) function determines whether the claim can be granted immediately 342, based on information already received from the distributed mutex mechanism, as a consequence of an equivalent claim being made by the corresponding thread in another replica.

If the claim cannot be granted immediately, the CMT claim( ) function requests 344 mutex M for thread T from the distributed mutex mechanism, and suspends 346 T until M can be granted. The thread executes the steps shown in FIG. 13 when it resumes.

Figure 14:
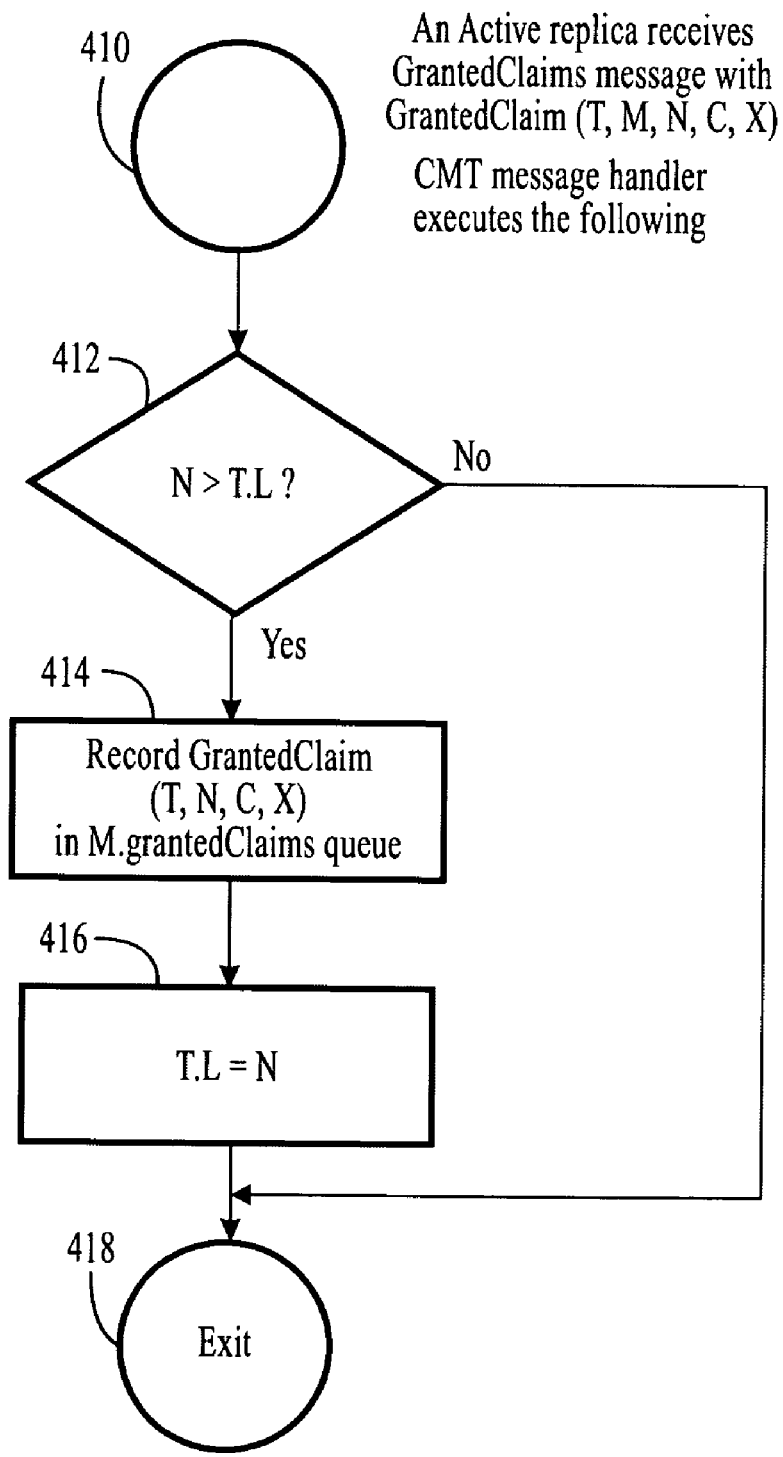
FIG. 14 is a flowchart of an active replica receiving a GrantedClaims message according to an aspect of the present invention, showing the steps taken by the CMT message handler when it receives that message.

If the claim can be granted, it is granted 348, and the CMT claim( ) function determines 350 whether T.N is greater than the claim number T.L of the most recent GrantedClaim recorded in the grantedClaims queue for thread T. If not, then the active replica has already received a GrantedClaim message for that claim, containing mutex ordering information, perhaps with a checkpoint, and recorded it in the grantedClaims queue, as shown in FIG. 14. In this case, the CMT claim( ) function does not take a checkpoint of the shared data.

If T.N is greater than T.L, the CMT claim( ) function checks 352 whether the current threadCheckpointNumber T.C is greater than the mutexCheckpointNumber M.C of the most recent checkpoint for the shared data. If so, the CMT claim( ) invokes the get_shared_data( ) method 354 of mutex M to obtain a checkpoint of the shared data and creates a GrantedClaim that includes the checkpoint 356 and multicasts the GrantedClaims message to the replicas. If not, the CMT claim( ) function creates the GrantedClaim without the checkpoint 358 and multicasts the GrantedClaims message to the replicas.

The CMT claim( ) function then updates M.C and T.N 360, and returns 362.

Active Replica Thread Invokes CMT Release( ) Function to Release a Mutex

When thread T of an active replica invokes the CMT release( ) function to release mutex M, the CMT release( ) function executes the following steps: invoke the release( ) function of the operating system thread library to release mutex M.

Figure 12:
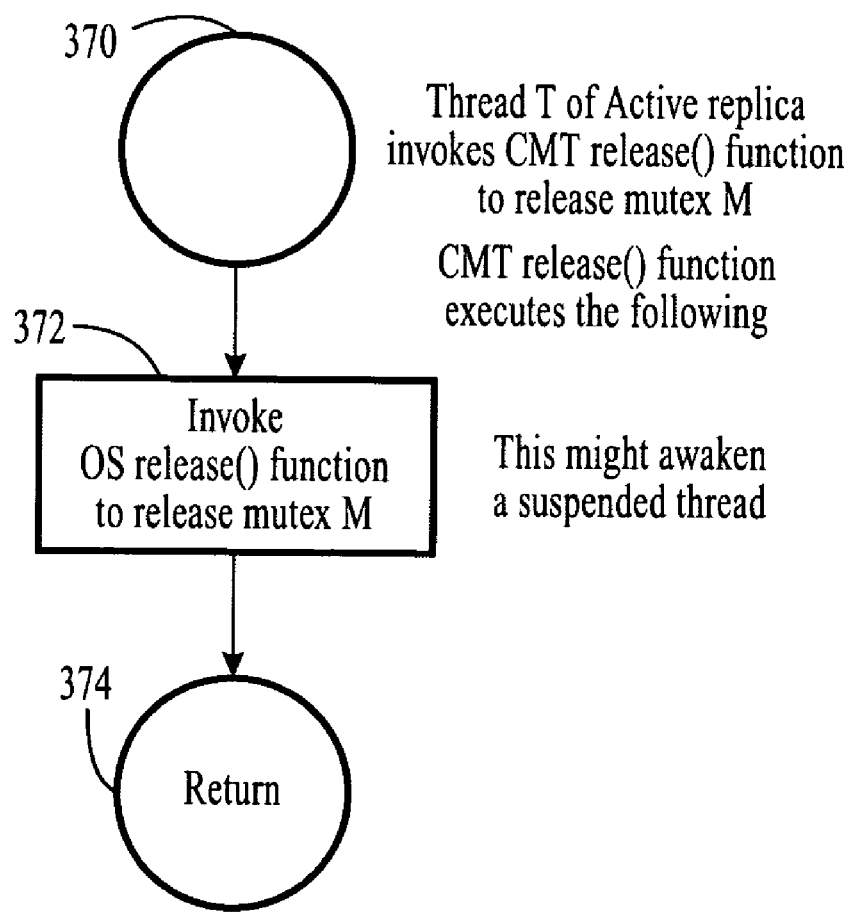
FIG. 12 is a flowchart of a thread of an active replica invoking the CMT release( ) function for a mutex according to an aspect of the present invention, shown executing steps taken by the CMT release( ) function.

Thus, in FIG. 12, at an active replica, when thread T invokes the CMT release( ) function 370 for mutex M, the CMT release( ) function invokes the release( ) function 372 of the operating system thread library for mutex M and then returns, allowing thread T to proceed 374. Releasing mutex M might cause another thread to be awakened so that it can claim mutex M.

Active Replica is Awakened while Waiting to Claim a Mutex

At an active replica, when thread T is awakened within the CMT claim( ) function, while waiting to claim mutex M, as its Nth claim to any mutex, the CMT claim( ) function executes the following steps:

```
if M can be granted to T
    grant M to T
    if T.N > T.L
        if T.C > M.C
            X = M.get_shared_data( )
            create GrantedClaim (T, M, T.N, T.C, X)
            multicast GrantedClaims message to replicas
        else
            create GrantedClaim (T, M, T.N, T.C, -)
            multicast GrantedClaims message to replicas
        else { }    // checkpoint is already received
        M.C = T.C
        T.N = T.N+1
    else
        suspend T
```

Figure 13:
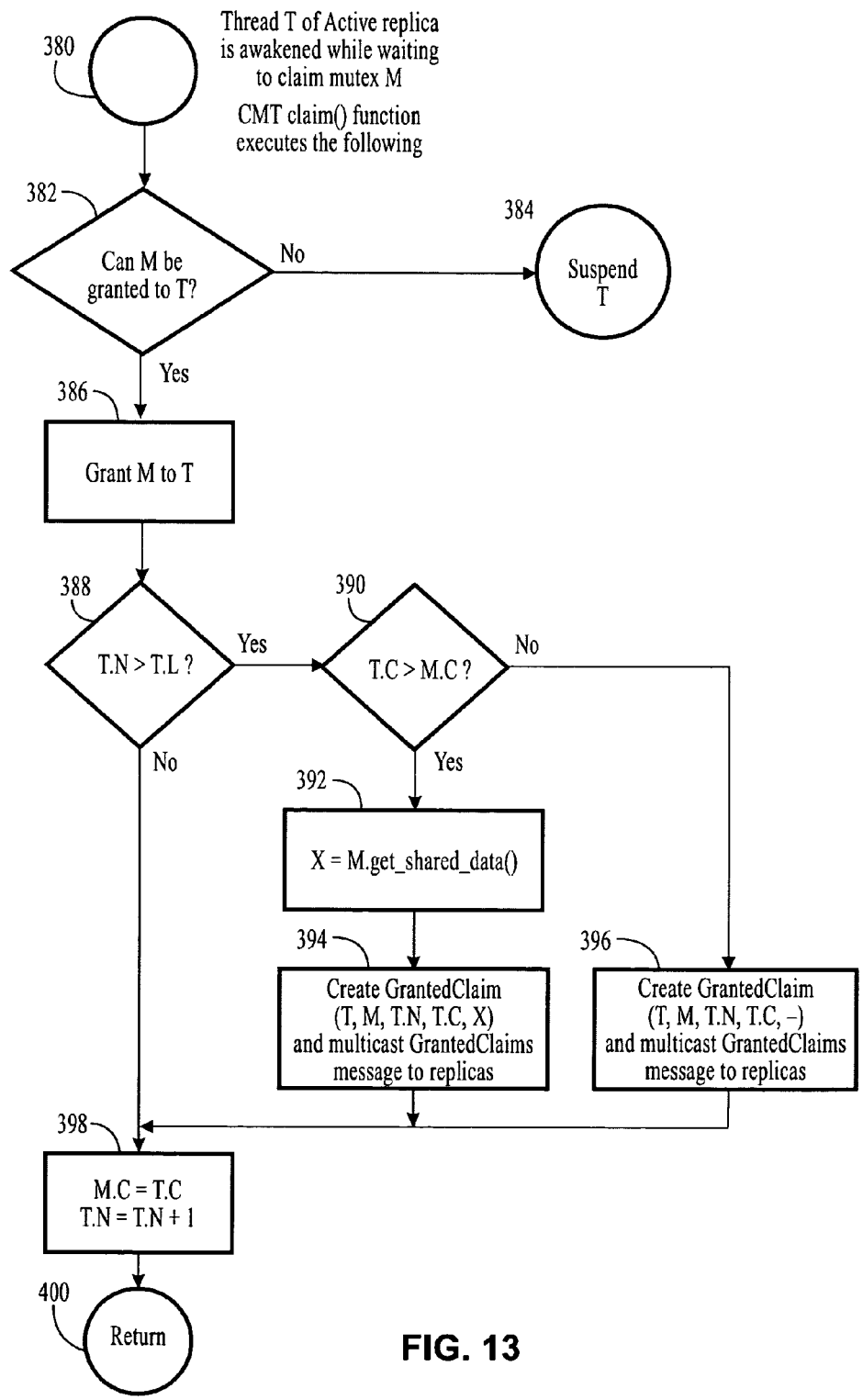
FIG. 13 is a flowchart of a thread of an active replica according to an aspect of the present invention, shown awakened while waiting for a mutex and the steps taken by the CMT claim( ) function.

Thus, as shown in FIG. 13, at an active replica, when thread T is awakened 380, within the CMT claim( ) function, while waiting for mutex M as its T.Nth claim, the CMT claim( ) function determines, based on information received from the distributed mutex mechanism, whether the claim of M can be granted to T immediately 382. If the claim of M cannot be granted to T immediately, the CMT claim( ) function suspends T 384 until M can be granted.

If the claim of M can be granted to T, it is granted 386. The CMT claim( ) function then determines 388 whether T.N is greater than the claim number T.L of the most recent GrantedClaim recorded in the grantedClaims queue for thread T. If T.N is less than or equal to T.L, then the active replica has already received a GrantedClaim message for that claim, containing mutex ordering and grant information, perhaps with a checkpoint, and recorded it in the granted-Claims queue, as shown in FIG. 14. In this case, the CMT claim( ) function does not take a checkpoint of the shared data, but proceeds to block 398 setting M.C to T.C and incrementing T.N prior to a return.

If T.N is greater than T.L, the CMT claim( ) function checks 390 whether the current threadCheckpointNumber T.C is greater than the mutexCheckpointNumber M.C of the most recent checkpoint for the shared data. If so, the CMT claim( ) invokes the get_shared_data( ) method 392 of mutex M to obtain a checkpoint of the shared data and creates a GrantedClaim that includes the checkpoint 394 and multicasts the GrantedClaims message to the replicas. If not, the CMT claim( ) function creates the GrantedClaim without the checkpoint 396 and multicasts the GrantedClaims message to the replicas.

The CMT claim( ) function then sets M.C to T.C and increments T.N at block 398, and returns at block 400.

Active Replica Receives a GrantedClaims Message

When an active replica receives a GrantedClaims message with GrantedClaim (T, M, N, C, X), the CMT message handler executes the following steps:

```
if N > T.L
    record GrantedClaim (T, M, N, C, X) in the grantedClaims queue
T.L = N
```

Thus, as shown in FIG. 14, if an active replica receives 410 a GrantedClaims message with GrantedClaim (T, M, N, C, X), it checks 412 whether the claim number N is greater than the largest claim number T.L yet received in a GrantedClaim in a GrantedClaims message for thread T. If so, the CMT message handler records the GrantedClaim in the GrantedClaim queue 414, sets T.L to N' 416 at block 416, and exits at block 418.

New or Restarting Replica Receives a GrantedClaims Message

When a new or restarting replica receives a GrantedClaims message, the CMT message handler extracts, in order, each GrantedClaim (T, M, N, C, X) from the message and executes the following steps:

```
append (T, N, C, X) to the M.grantedClaims queue
labelC:
determine the first entry (T', N', C', X') in M.grantedClaims
if T == T'
    if C' < T'.C
        discard the first entry in M.grantedClaims
        goto labelC
    if M.available and T.suspended
        invoke the signal( ) function of the OS thread library to
        awaken T
```

Figure 15:
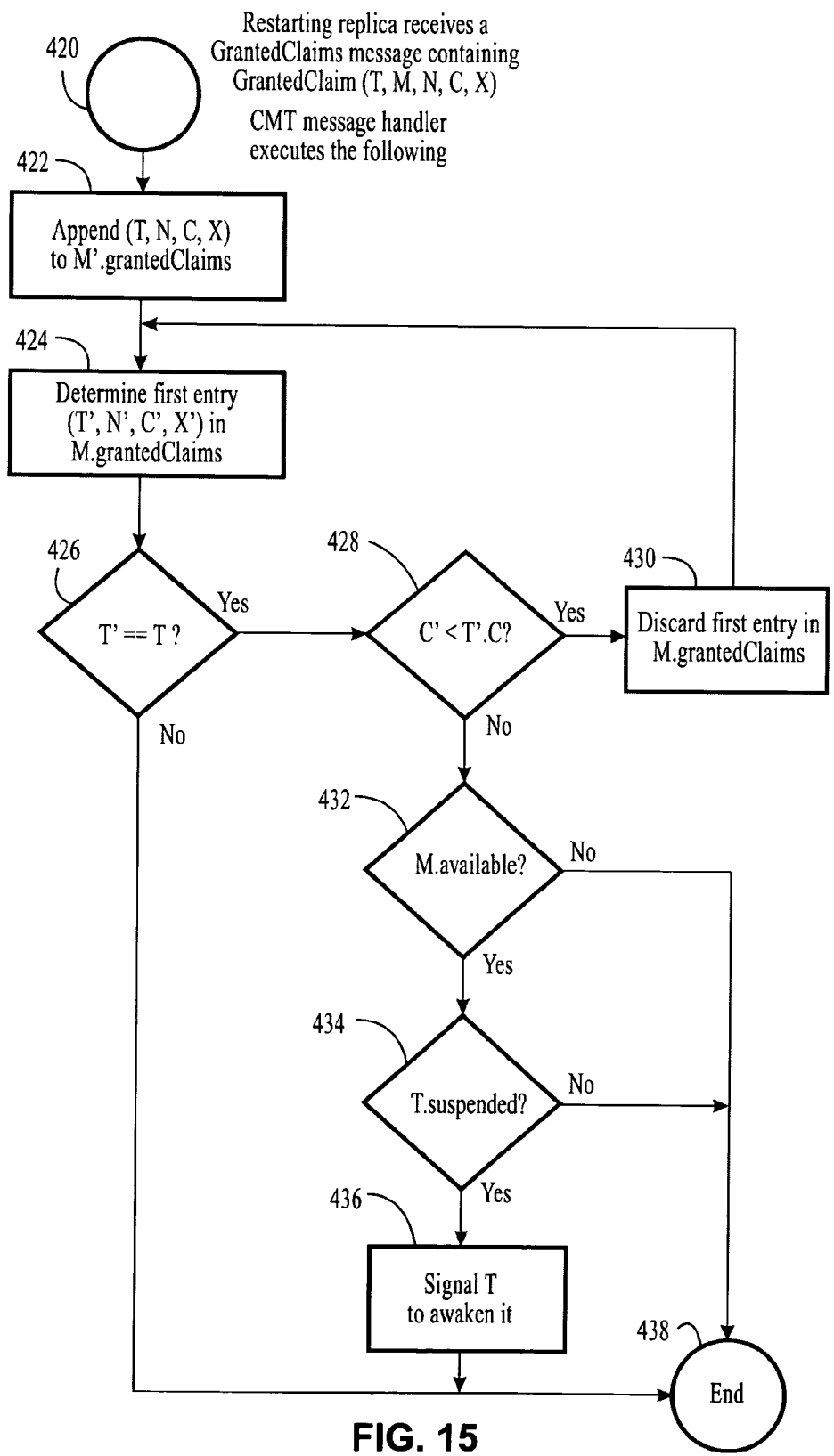
FIG. 15 is a flowchart of a new or restarting active replica receiving a GrantedClaims message according to an aspect of the present invention, showing the steps taken by the CMT message handler when it receives that message.

As shown in FIG. 15, when a new or restarting replica receives 420 a GrantedClaims message, for each entry (T, M, N, C, X) extracted in order from that message, the CMT message handler appends 422 the 4-tuple (T, N, C, X) to the M.grantedClaims queue. It then determines 424 the first entry (T', N', C', X') in the M.grantedClaims queue and checks 426 whether T=T'.

If T=T', the CMT message handler checks at block 428 whether C'<T'.C. If C' is less than T'.C, the CMT message handler determines that the entry is obsolete and discards 430 that entry and returns to labelC to consider the next entry in the M.grantedClaims queue 424. If C' is greater than or equal to T'.C, the CMT message handler checks whether M is available 432 and whether T is suspended 434. If M is available and T is suspended, it invokes the signal( ) function of the operating system thread library to awaken T 436 and terminates 438. If M is not available or T is not suspended, the CMT message handler does not process the entry any further but terminates 438.

New or Restarting Replica Thread Invokes Claim( ) Function to Claim a Mutex

At a new or restarting replica, when a thread T invokes the CMT claim( ) function to claim a mutex M as its Nth claim to any mutex, the CMT claim( ) function executes the following steps:

```
labelA:
determine the first entry (T', N', C', X') in the M.grantedClaims queue
if T == T'
    if M.available
        if N' < T.N
            discard first entry
            go to labelA
        else
            M.available = false
            grant M to T
            remove (T', N', C', X') from M.grantedClaims queue
            assert T.C == C'
            if X' != NULL
                M.set_shared_data(X')
            M.C = C'
            T.N = T.N+1
    else
        suspend T
else
    if C' < T.C
        discard the first entry in the M.grantedClaims queue
        goto labelA
    else
        suspend T
```

Figure 16:
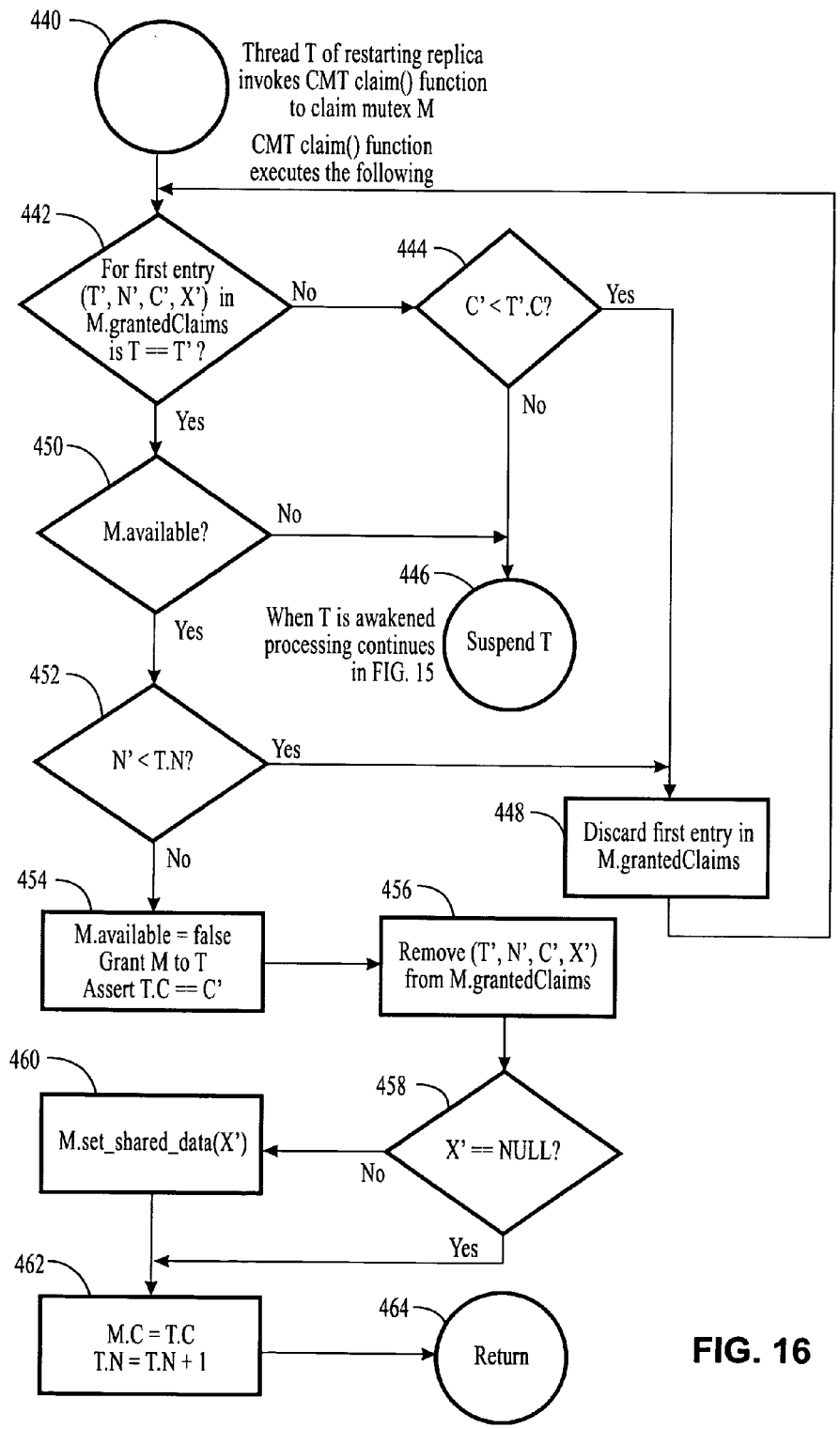
FIG. 16 is a flowchart of a thread of a new or recovering active replica invoking the CMT claim( ) function for a mutex according to an aspect of the present invention, showing general steps taken within the claim( ) function.

Thus, in FIG. 16, at a restarting replica, when thread T invokes 440 the CMT claim( ) function for mutex M as its Nth claim, the CMT claim( ) function first checks 442 whether T=T' for the first entry (T', N', C', X') in the M.grantedClaims queue. If T=T', it checks 450 whether M is available. If M is available, it checks 452 whether N'<T.N.

If N' is less than T.N, it discards 448 the first entry in the M.grantedClaims queue and continues execution at labelA 442.

If N' is greater than or equal to T.N, the CMT claim( ) function sets M.available to false and grants M to T 454. At that point, the threadCheckpointNumber T.C should equal C'. It then removes 456 (T', N', C', X') from the M.grantedClaims queue. If X' is not NULL 458, the CMT claim( ) function invokes the set_shared_data( ) method 460 of mutex M with parameter X', so that the shared data protected by M can be set to the checkpointed values recorded in X'. In any case, it then sets the mutexCheckpointNumber M.C of the shared data protected by mutex M to T.C=C' and increments T.N at block 462 and returns at block 464.

If M is not available, the CMT claim( ) function suspends T at block 446.

If T≠T' 442, the CMT claim( ) function checks at block 444 whether C'<T'.C, where T'.C is the threadCheckpointNumber for thread T'. If C' is less than T'.C, then the entry is obsolete and the CMT claim( ) function discards 448 that entry, and returns to labelA to consider the next entry in M.grantedClaims 442. If C' is greater than or equal to T'.C, the CMT claim( ) function suspends thread T at block 446.

New or Restarting Replica Thread Invokes the Release( ) Function to Release a Mutex When a new or restarting thread T invokes the CMT release( ) function to release mutex M, the CMT release( ) function executes the following steps:

```
set M.available to true
labelB:
if the M.grantedClaims queue is not empty
    determine the first entry (T', N', C', X') in the M.grantedClaims
    queue
```

-continued

```
if C' < T'.C
    discard the first entry in the M.grantedClaims queue
    goto labelB
if T'.suspended
    awaken thread T'
```

Figure 17:
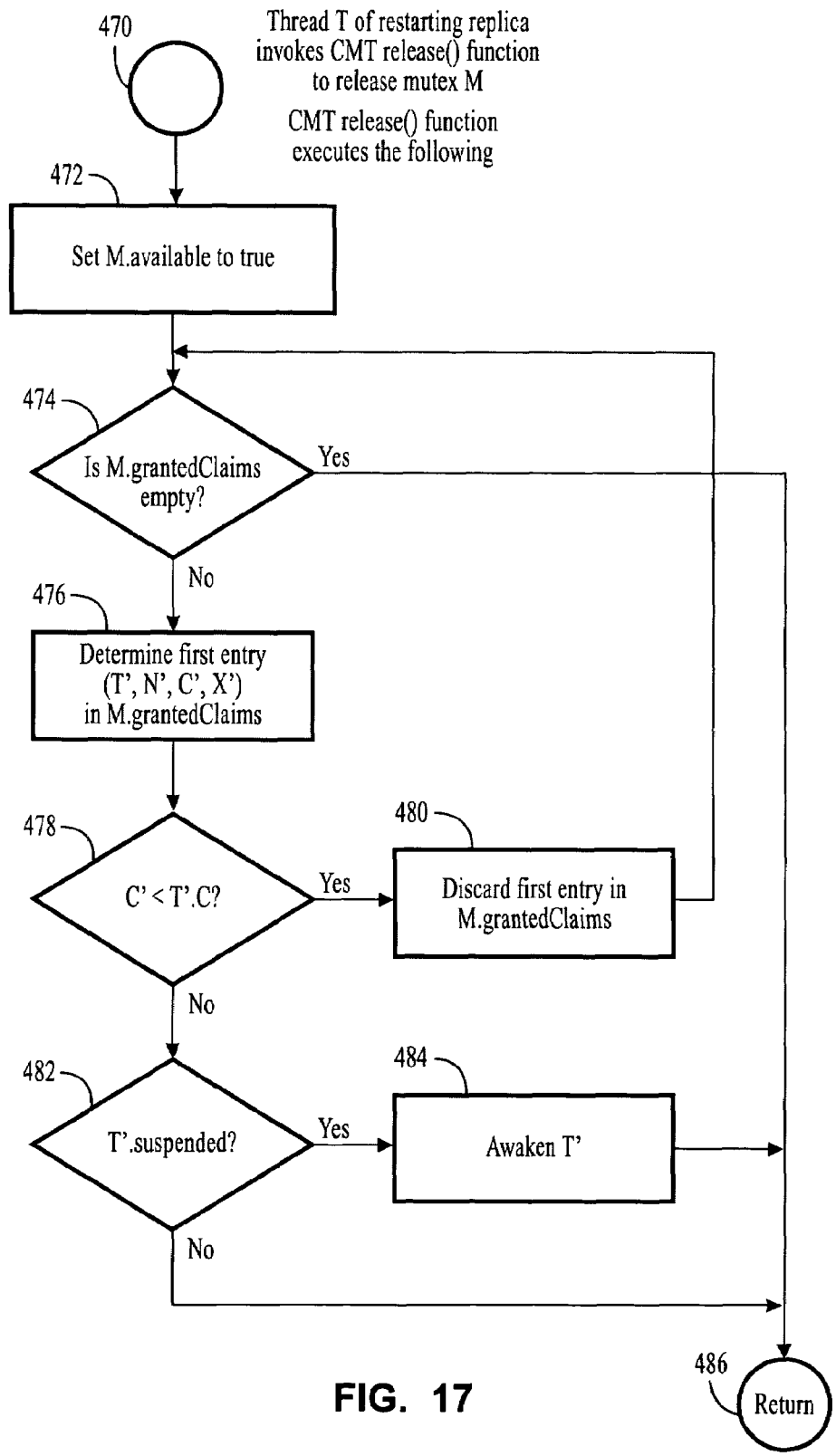
FIG. 17 is a flowchart of a thread of a new or recovering active replica invoking the CMT release( ) function for a mutex according to an aspect of the present invention, showing the general steps taken during release( ).

Thus, in FIG. 17, when a thread of a restarting replica invokes the CMT release( ) function 470 for mutex M, the CMT release( ) function sets M.available to true 472. It then checks at block 474 whether the M.grantedClaims queue is empty.

If the M.grantedClaims queue is not empty, the CMT release( ) function determines at block 476 the first entry (T', N', C', X') in the M.grantedClaims queue. Next, the CMT release( ) function checks at block 478 whether C'<T'.C, where T'.C is the threadCheckpointNumber for thread T'. If C' is less than T'.C, then the entry is obsolete and the CMT release( ) function discards that entry 480, and flow returns to labelB to reconsider the next entry in the M.grantedClaims queue 474. If C' is greater than or equal to T'.C, it checks at block 482 whether thread T' is suspended. If thread T' is suspended, the CMT release( ) function invokes the signals function 484 of the OS thread library to awaken thread T' and then returns at block 486. Otherwise, it simply returns at block 486.

New or Restarting Replica Thread is Awakened

When a new or restarting replica thread T is awakened while waiting for mutex M as claim T.N, the CMT claim( ) function executes the following:

```
if M.available
    labelD:
        determine the first entry (T', N', C', X') in the M.grantedClaims
        queue
        if T == T'
            if N' < T.N
                discard the first entry in the M.grantedClaims queue
                go to labelD
            T.suspended = false
            M.available = false
            grant M to T
            remove (T', N', C', X') from the M.grantedClaims queue
            if X' != NULL
                M.set_shared_data(X')
            M.C = C'
            T.N = T.N+1
        else
            if C' < T'.C
                discard the first entry in the M.grantedClaims queue
                goto labelD
            else
                suspend T
else
    suspend T
```

Figure 18:
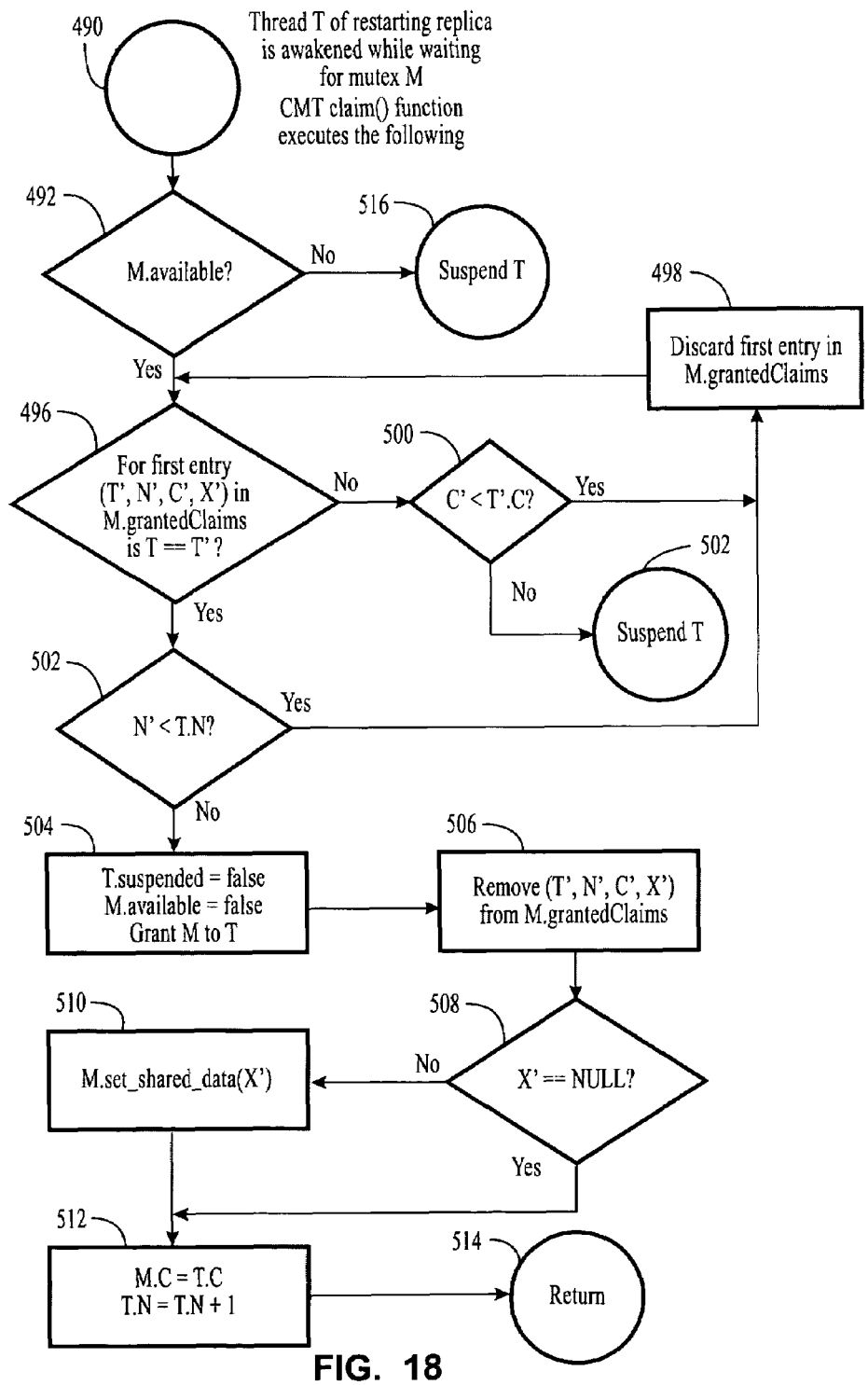
FIG. 18 is a flowchart of a thread of a new or recovering active replica according to an aspect of the present invention, shown awakened while waiting for a mutex and the steps taken by the CMT claim( ) function.

Thus, in FIG. 18, when a thread T of a restarting replica is awakened at block 490 while waiting for mutex M as claim N, the CMT claim( ) function checks 492 whether mutex M is available. If M is available, it then checks at block 496 whether T=T' for the first entry in the M.grantedClaims queue (T', N', C', X').

If T=T', the CMT claim( ) function then checks 502 whether N'<T.N. If N' is less than T.N, it discards 498 the first entry in the grantedClaims queue and returns to labelD 496.

If N' is greater than or equal to T.N, it sets T.suspended to false, sets M.available to false and grants 504 mutex M to thread T. The CMT claim( ) function then removes 506 the entry (T', N', C', X') from the M.grantedClaims queue. If X' is not NULL at block 508, the CMT claim( ) function invokes the M.set_shared_data( ) method 510 with parameter X', so that the shared data protected by M can be set to the checkpoint X'. It then sets the mutexCheckpointNumber M.C for the shared data to the threadCheckpointNumber T.C=C' for thread T, and increments T.N at block 512, and returns at block 514.

If T !=T', the CMT claim( ) function checks at block 500 whether C'<T'.C, where T'.C is the threadCheckpointNumber for thread T'. If C' is less than T'.C, then the first entry in M.grantedClaims is obsolete and the CMT claim( ) function discards 498 that entry and branches to labelD to consider the next entry in the M.grantedClaims queue 494. If C' is greater than or equal to T'.C, the CMT claim( ) function suspends thread T at block 502. Similarly, if mutex M is not available, the CMT claim( ) function suspends thread T at block 516.

Checkpointing and Restoration Methods

The checkpointing and restoration methods are described below.

The get_thread_state( ) Method

The get_thread_state( ) method is implemented for each invoked-checkpoint thread. It is invoked by the checkpoint infrastructure as a part of taking a checkpoint. Pseudocode for the get_thread_state( ) method is as follows:

```
ByteSequence get_thread_state( )
    ByteSequence X
    T.C=objectCheckpointNumber
    insert values of local variables of thread T into X
    return X
```

The get_thread_state( ) method first sets T.C to the current value of the objectCheckpointNumber. It then constructs a byte sequence X containing the values of the local variables of thread T, and returns the byte sequence X as the result of the method invocation.

The set_thread_state( ) Method

The set_thread_state( ) method is implemented for each invoked-checkpoint thread. It is invoked by the checkpoint infrastructure as a part of starting a thread from a checkpoint. Pseudocode for the set_thread_state( ) method is as follows:

```
void set_thread_state(ByteSequence X)
    T.C=objectCheckpointNumber
    extract values of local variables of thread T from X
    return
```

The set_thread_state( ) method first sets T.C to the current value of the objectCheckpointNumber. It then extracts the values of the local variables of thread T from the byte sequence X provided as the parameter of the method. Thread T is now ready to receive and process method invocations.

The record_thread_state( ) Method

The record_thread_state( ) method is invoked by a self-checkpointing thread when it needs to record a checkpoint.

Pseudocode for the record_thread_state( ) method is as follows:

```
void record_thread_state(ThreadId T, int c, ByteSequence X)
    record X as checkpoint for thread with identifier T and
        threadCheckpointNumber c
    return
A typical usage of record_thread_state( ) is as follows:
if T.C < objectCheckpointNumber
    save the values of the local variables and global variables
        in the checkpointStruct
    save the value of objectCheckpointNumber in checkpointStruct
    record_thread_state(T, threadCheckpointNumber,
checkpointStruct)
```

First, the thread compares the threadCheckpointNumber T.C of the last checkpoint that thread T recorded with the particular objectCheckpointNumber. If threadCheckpointNumber T.C is less than objectCheckpointNumber, the local variables of the current method, and also the global variables that are specific to the thread, are saved in the checkpoint structure. The objectCheckpointNumber is also saved in the checkpoint structure. The thread then invokes the record_thread_state( ) method of the checkpoint infrastructure with the thread identifier, the thread checkpoint number and the checkpoint structure as parameters.

The restore_thread_state( ) Method

The restore_thread_state( ) method of a self-checkpointing thread is invoked by the checkpoint infrastructure to prepare a thread for being started from a checkpoint. Pseudocode for restoring the state is as follows:

void restore_thread_state(ByteSequence X)
    T.C=objectCheckpointNumber
    T.restoringCheckpoint=true
    extract the checkpointStruct of thread T from X
    return The restore_thread_state( ) method first sets T.C to the objectCheckpointNumber, and then sets the flag T.restoringCheckpoint to true to indicate that the thread is restarting from a checkpoint. The method then extracts the thread's checkpoint structure from the byte sequence parameter X of the method, and returns. The thread is actually restarted by reinvoking the last invocation of the thread. Code inserted into the self-checkpointing thread ensures that the thread does not repeat all of the processing that the thread already performed, but rather, restores values of variables from the checkpoint structure and resumes normal processing at the point at which the checkpoint was taken.

The get_shared_data( ) Method

This method is invoked by the CMT claim( ) function of the mutex that controls access to the shared data, and is provided by the application programmer or by a source-code preprocessor tool, described below. It collects the values of the shared data and packs them into a compact form, such as a byte sequence, for checkpointing.

The set_shared_data( ) Method

This method is invoked by the CMT claim( ) function of the mutex that controls access to the shared data, and is provided by the application programmer or by a source-code preprocessor tool, described below. It unpacks the checkpointed data from its compact representation and assigns the values to the shared data variables.

Preparing a Program for Checkpointing

The process of preparing the source code of the application program for checkpointing involves cooperation between the application programmer and the source-code preprocessor tool. The pseudocode for that cooperation is shown below and is illustrated in FIG. 19 and FIG. 20.

The tool analyzes the control flow graph to identify all loops. For each such loop, from the number and kinds of statements within the loop, it estimates the duration of a single iteration of the loop. It then determines if the loop is of long duration. It can determine the maximum number of iterations of the loop, and preferably consults the application programmer in this determination. If the time estimated for the maximum number of iterations exceeds an application-determined limit, provided by the application programmer, then the loop is regarded as a loop of long duration.

```
construct the control flow graph for the application program
perform a transitive reachability analysis on the control flow graph
identify all loops of long duration
for each loop of long duration
    report the loop to the application programmer
    with the assistance of the application programmer
        insert an invocation of record_thread_state( ) into the loop
for each thread T
    if thread T is self-checkpointing
        insert the restore_thread_state( ) method for thread T
    else
        insert the get_thread_state( ) and set_thread_state( )
            methods for thread T
    allocate space for the global variables of thread T
        in the checkpointStruct for thread T
for each program section S
    assign a unique identifier s to S
    if a statement of the form record_thread_state( ) is
reachable from S
        set s.containsCheckpoint to true
        perform the program transformations on S
    else
        set s.containsCheckpoint to false
```

Figure 19:
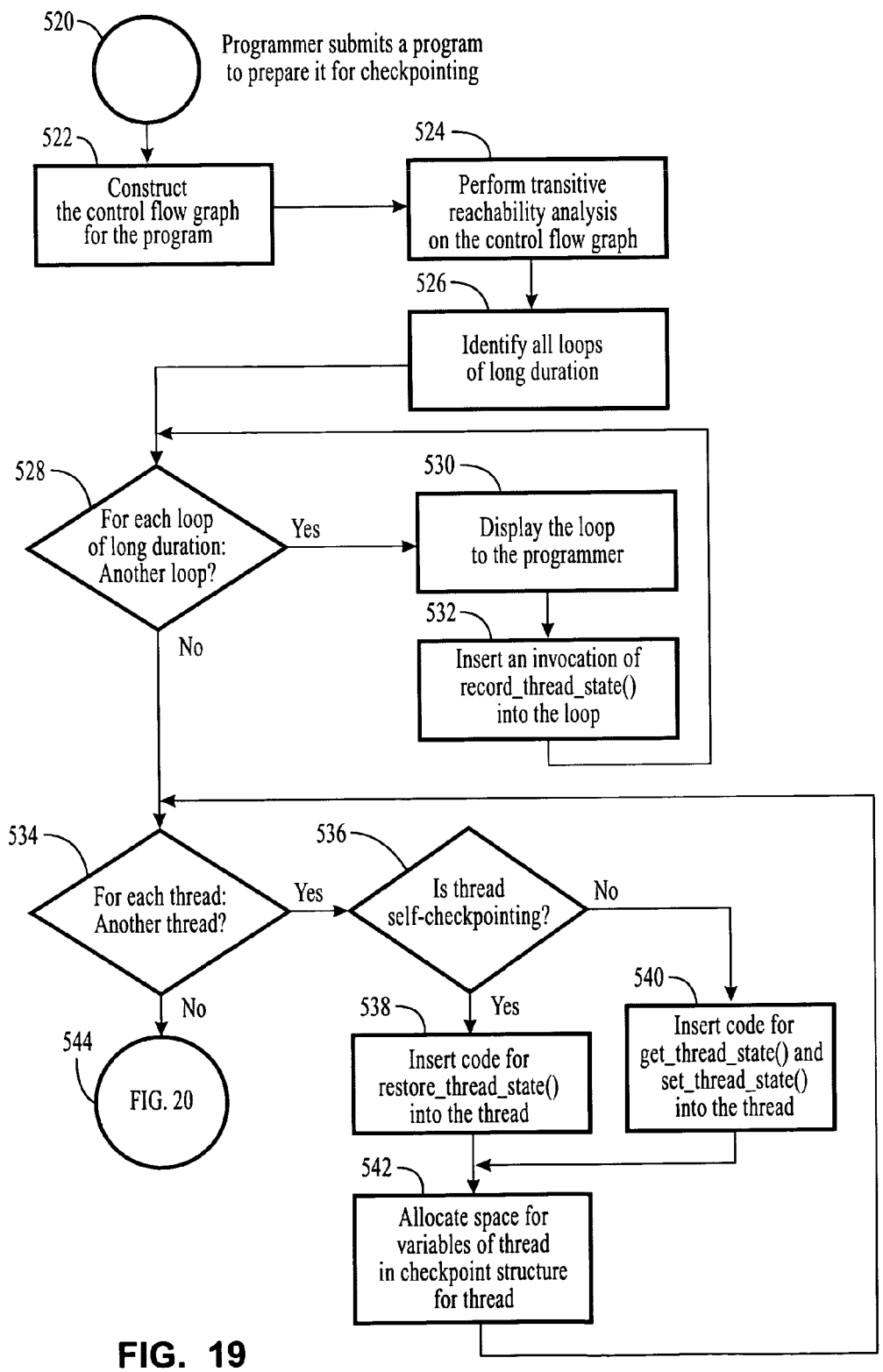
FIG. 19 and FIG. 20 are a flowchart of the process of preparing the source code of an application program for checkpointing according to an aspect of the present invention, showing the cooperation involved between the application programmer and the source-code preprocessor tool.
Figure 20:
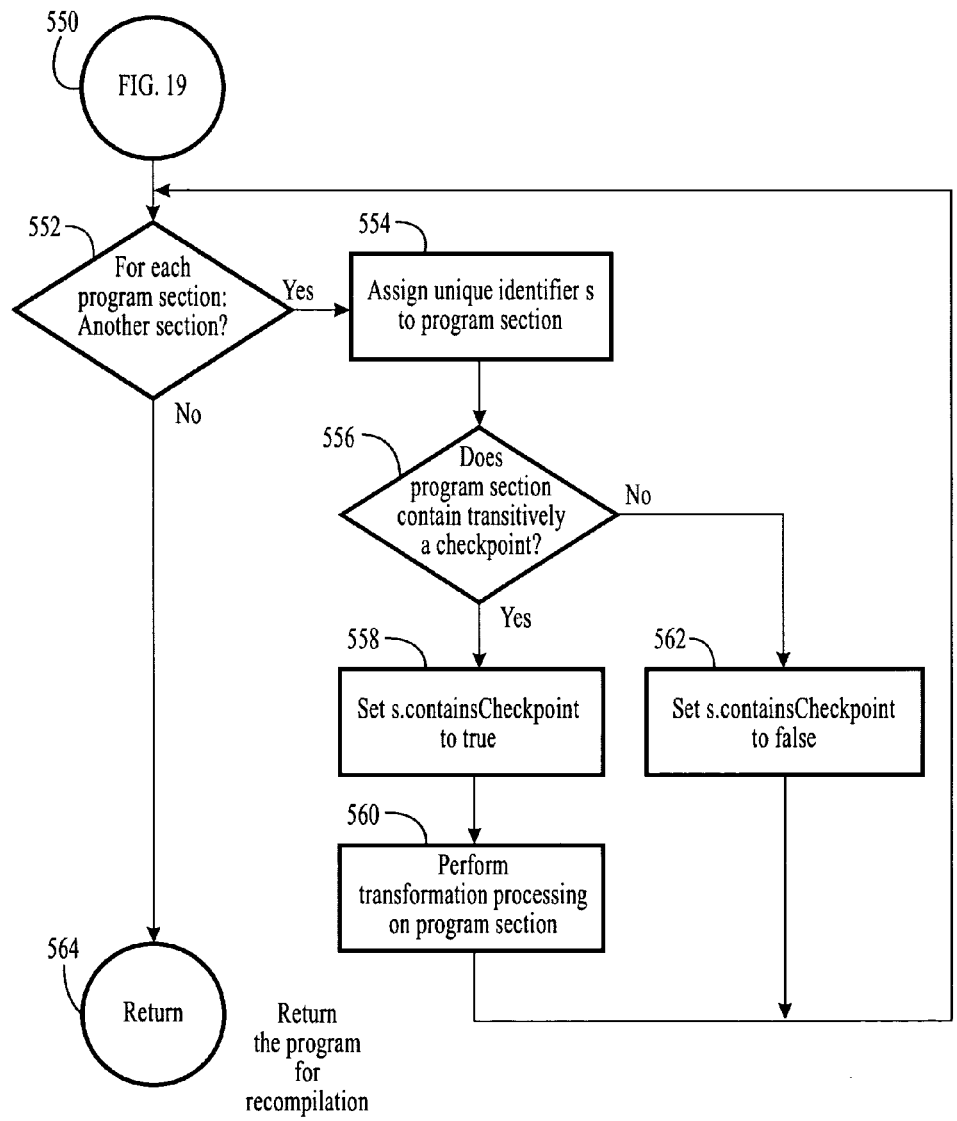

As shown in FIG. 19, the application programmer submits the source code of the application program to the source-code preprocessor tool at block 520. The tool parses the program source code and constructs a control flow graph for the program 522, using technology that is well known in the art. The tool also performs a transitive reachability analysis on the control flow graph 524, again using technology that is well known in the art, and then identifies all loops of long duration 526.

For each loop of long duration at block 528, the tool displays the loop to the application programmer 530. The tool or the application programmer chooses a point within the loop, and the tool inserts an invocation of the record_thread_state( ) method into the loop 532.

Next, for each thread of the application program 534, the tool determines whether the thread can invoke the record_thread_state( ) method. If so, the thread is a self-checkpointing thread at block 536; otherwise, the thread is an invoked-checkpoint thread.

For each self-checkpointing thread, the tool inserts the source code of the restore_thread_state( ) method into the source code for the thread 538. For each invoked-checkpoint thread, the tool inserts the source code for the get_thread_state( ) and set_thread_state( ) methods into the source code for the thread 540. Some threads, such as the threads of a thread pool, share common code. For such threads, a single insertion of restore_thread state( ), or of get_thread_state( ) and set_thread_state( ), into the common code suffices. Technology for processing the source code of a program, to generate additional source code for methods, such as get_thread_state( ) and set_thread_state( ), is well known in the art.

For each self-checkpointing thread, the checkpoint infrastructure employs a checkpoint structure in a compact form such as a byte sequence. During the preparation of the program, the tool determines which data must be checkpointed for each self-checkpointing thread and, thus, the checkpoint structure for that thread.

As a part of the processing for each thread, the tool determines the global variables of the thread and assigns space for them in the checkpoint structure for the thread at block 542. Data that are shared between several threads must be protected by a mutex, and are checkpointed as a part of claiming that mutex. Variables that are local to a method, within the processing of the thread, are checkpointed as a part of the method invocation.

The flow chart of FIG. 19 at block 544 is continued in FIG. 20 at block 550.

For each program section that has been determined by the parsing and control flow analysis of the program source code at block 552, the tool assigns a unique identifier s to that program section 554. The tool then determines, from the transitive flow analysis, whether an invocation of the record_thread_state( ) method can be reached from that program section at block 556. If yes, s.containsCheckpoint is set to true 558; if no, s.containsCheckpoint is set to false 562. For each program section S, for which s.containsCheckpoint is set to true, the tool performs a source code transformation 560, replacing the original program source code S by new source code, as defined below for each kind of program section.

Once all sections of the program have been processed, the tool returns the modified source code of the program for recompilation 564.

Program Transformations

For each kind of program section in the source code of the application program, the source code is transformed according to the following rules. The program is considered as a sequence of program sections. Associated with each program section S is a program section identifier s and additional information such as the kind of program section and whether the program section contains a statement for taking a checkpoint.

The kinds of program sections are different for different programming languages. The various kinds of program sections described below are general and represent the most important kinds of program sections. The appropriate transformations for other kinds of program sections, that a particular programming language might require, can be derived easily from the set of transformations given below by persons who are reasonably skilled in the art.

The Method Declaration

No direct transformation of the source code is performed for a method declaration. Instead, the local variables of the method are identified and space is allocated for them, indexed by the program section identifier s for the program section S, in the checkpoint structures for the threads that invoke the method.

```
for program section S of the form "returnType M(P1, . . . , Pn) { . . . }"
    if s.containsCheckpoint
        allocate space for local_variables in the checkpointStruct for
        s
```

The Assignment Statement

The program transformation that is required for an assignment statement, or for sequences of assignment statements, is to place the assignment statements within a conditional statement. If the restoringCheckpoint variable of the thread is true, no assignments are performed because all such assignments are made from values recorded in the checkpoint structure. If the restoringCheckpoint variable of the thread is false, the assignments are made as originally programmed.

```
for program section S of the form "V1 = A1; V2 = A2; . . . "
    if s.containsCheckpoint
        replace S by
        "
        if T.restoringCheckpoint
        { }
        else
            V1 = A1
            V2 = A2
            . . .
        "
```

The Conditional Statement

For a conditional statement with boolean conditional expression B, the transformation declares an auxiliary boolean variable b. Space for b must be allocated in the checkpoint structure. In the transformed source code, if the restoringCheckpoint variable of the thread is true, the value of b is extracted from the checkpoint structure. If the restoringCheckpoint variable of the thread is false, the conditional expression B is evaluated, set to the value of b and recorded in the checkpoint structure. The conditional statement is then executed using the auxiliary variable b.

```
for program section S of the form "if B { XXX } else { YYY }"
    if s.containsCheckpoint
        allocate space for b in checkpointStruct for s
        replace S by
        "
        if T.restoringCheckpoint
            extract b from checkpointStruct for s
        else
            b = B
            save b in checkpointStruct for s
        if b
            XXX
        else
            YYY
        "
```

The While Loop Statement

For a while loop statement with boolean loop control expression C, the transformation declares an auxiliary boolean loop control variable c. Space for c must be allocated in the checkpoint structure. In the execution of the transformed source code, if the value of the restoringCheckpoint variable of the thread is false, the loop control expression C is evaluated and the value is assigned to c and is recorded in the checkpoint structure. If the value of the restoringCheckpoint variable of the thread is true, the value of c is extracted from the checkpoint structure. In both cases, the while loop statement is then executed using the auxiliary loop control variable c. At the end of the loop body, the loop control expression C is evaluated and the value is assigned to c and is recorded in the checkpoint structure.

```
for program section S of the form "while C { XXX }"
    if s.containsCheckpoint
        allocate space for c in checkpointStruct for s
        replace S by
        "
        if T.restoringCheckpoint
            extract c from checkpointStruct for s
        else
            c = C
            save c in checkpointStruct for s
        while c
            XXX
            c = C
            save c in checkpointStruct for s
        "
```

The For Loop Statement

For a for loop statement with integer loop control expressions A, B, C, the transformation declares auxiliary integer loop control variables a, b, c. The transformation also declares an auxiliary integer loop control variable i. Space for a, b, c and i must be allocated in the checkpoint structure. In the execution of the transformed source code, if the value of the restoringCheckpoint variable of the thread is true, the values of a, b, c are extracted from the checkpoint structure. If the value of the restoringCheckpoint variable of the thread is false, the loop control expressions A, B, C are evaluated and are set to the values of a, b, c recorded in the checkpoint structure. The for loop statement is then executed using the auxiliary loop control variables a, b, c.

At the start of the body of the loop, if the value of the restoringCheckpoint variable of the thread is true, the value of the auxiliary variable i is extracted from the checkpoint structure and is assigned to the loop control variable I. Again, the value of c is determined by evaluating the loop control expression C and is recorded in the checkpoint structure. If the value of the restoringCheckpoint variable of the thread is false, the value of the loop control variable I is recorded in the checkpoint structure.

```
for program section S of the form "for I = A, B, C { XXX }"
    if s.containsCheckpoint
        allocate space for a, b, c in checkpointStruct for s
        replace S by
        "
        if T.restoringCheckpoint
            extract a, b, c from checkpointStruct for s
        else
            a = A
            b = B
            c = C
            save a, b, c in checkpointStruct for s
```

-continued

```
        for I = a, b, c
            if T.restoringCheckpoint
                extract i from checkpointStruct for s
                I = i
            else
                save I in checkpointStruct for s
            XXX
        "
```

The Method Invocation

Immediately before a method invocation, if the value of the restoringCheckpoint variable of the thread is true, execution of the transformed code extracts the values recorded in the checkpoint structure, for the local variables of the method G that contains the method invocation statement, and assigns them to the local variables of the method G. If the value of the restoringCheckpoint variable of the thread is false, the transformed code records, in the checkpoint structure, the values of the local variables of the method G that contains the method invocation. The method G is then invoked. Note that the method invocation need not be a separate statement. If the method invocation occurs within an expression, the transformation described here can still be applied with minor modifications that should be obvious to persons reasonably skilled in the art.

```
for program section S within method G of the form "r = F(p1, p2, . . . )"
    if s.containsCheckpoint
        replace S by
        "
        if T.restoringCheckpoint
            extract values of local variables of G
                from checkpointStruct for g
        else
            save values of local variables of G in checkpointStruct
                for g
        r = F(p1,p2, . . . )
        "
```

The record_thread_stat ( ) Method

At the point in the source code of the program at which the application programmer or the tool has determined that an invocation of record_thread_state( ) is to be inserted, the tool transforms that simple invocation into the code below.

If the value of the restoringCheckpoint variable of the thread is true, the transformed code extracts the value of the checkpoint number c recorded in the checkpoint structure and compares it with the objectCheckpointNumber.

If the checkpoint number c recorded in the checkpoint structure and the objectCheckpointNumber are different, no checkpoint was recorded at this point in the program code and the checkpoint information is ignored. If they are equal, the transformed program code assigns the value of the checkpoint number, extracted from the checkpoint structure to the threadCheckpointNumber for the thread. The transformed code then extracts the values recorded in the checkpoint structure for the local variables of the method G that contains the invocation of record_thread_state( ), and also the values of the global variables recorded in the checkpoint structure, and assigns them to the corresponding local and global variables.

If the value of the restoringCheckpoint variable of the thread is false, the transformed code compares the checkpoint number of the most recent checkpoint T.C recorded by thread T with the objectCheckpointNumber.

If the threadCheckpointNumber is less than the objectCheckpointNumber, a new checkpoint is required. The transformed code records the values of the local variables of the method G that contains the invocation of record_thread_state( ), and also the values of the global variables in the checkpoint structure. It also records the value of the objectCheckpointNumber in the checkpoint structure. The transformed code then invokes the record_thread_state( ) method of the checkpoint infrastructure and sets the threadCheckpointNumber equal to the objectCheckpointNumber.

If the threadCheckpointNumber is greater than or equal to the objectCheckpointNumber, no new checkpoint is required and the transformed code records the value zero for the threadCheckpointNumber in the checkpoint structure to ensure that the checkpoint is not processed during restart as follows:

```
for program section S within method G of the form
        "record_thread_state( )"
    if s.containsCheckpoint
        replace S by
        "
        if T.restoringCheckpoint
            extract threadCheckpointNumber c
                from checkpointStruct for s
            if c == objectCheckpointNumber
                T.C = c
                extract values of local variables of G
                    from checkpointStruct for g
                extract values of global variables of T
                    from checkpointStruct for t
                T.restoringCheckpoint = false
            else
            { }
        else
            if T.C < objectCheckpointNumber
                save values of local variables of G
                    in checkpointStruct for g
                save values of global variables of T
                    in checkpointStruct for t
                save value of objectCheckpointNumber
                    in checkpointStruct for t
                record_thread_state(T,
                        objectCheckpointNumber,
                        checkpointStruct)
                T.C = objectCheckpointNumber
            else
                save zero for threadCheckpointNumber
                    in checkpointStruct for s
        "
```

Accordingly, it can be seen that the mechanisms of this invention allow threads of objects, processes or other components of multithreaded application programs to be asynchronously checkpointed and restored in a system subject to active replication. Different threads and different areas of shared data can be checkpointed at different times without the need to suspend all threads of a process to take a checkpoint. Ordering information for the mutexes, as well as checkpoint information, is communicated in messages and retained in message logs for restoring a new or recovering replica from a checkpoint. A checkpoint number is utilized to determine when a new checkpoint needs to be generated. Shared data, controlled by mutexes or other access control mechanisms, are checkpointed as needed to ensure consistent operation of the threads of an object, process or other component. The preferred mechanism for implementing the checkpointing functionality is by way of wrapper functions, such as within a Consistent Multithreading (CMT) library, for the mutex claim and release functions of the operating system thread library. Alternatives for incorporating the functionality include integrating it within the operating system or application layers. It should be appreciated that aspects of the invention and pseudo-code have been described by way of example, wherein one of ordinary skill in the art may modify numerous details without departing from the teachings of the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of checkpointing an object, process or other component of a multithreaded application program subject to active replication, comprising:
    controlling access to shared data by threads of a replica of said object, which claim mutexes to gain access to said shared data;
    ordering the processing of messages by, and the granting of mutexes to, said threads of said replica of said object competitively based on the first said processing or granting, wherein all replicas process messages and are granted mutexes in the same order;
    providing separate checkpointing for the local state of each said thread and for each shared data shared between said threads of said replica and protected by said mutex; and
    communicating mutex ordering information and checkpoints to a new or recovering replica configured to start from said checkpoint.

2. A method as recited in claim 1:
    wherein said mutex provides said thread with exclusive access to said shared data;
    wherein said mutex is controlled by a set of mutex functions; and
    wherein said thread must release said mutex when it has finished accessing said shared data, allowing another thread to access said shared data.

3. A method as recited in claim 1, wherein said mutex functions comprise claim and release functions.

4. A method as recited in claim 1, wherein said mutex functions are contained in a multithreading library interposed ahead of an operating system thread library, said multithreading library containing wrapper functions for the functions of said operating system thread library that claim and release mutexes, semaphores and condition variables, and also a checkpoint infrastructure for performing checkpointing.

5. A method as recited in claim 1, further comprising performing said checkpointing for different threads asynchronously.

6. A method as recited in claim 1, further comprising:
performing said checkpointing both for threads that are self-checkpointing and for threads upon which checkpoints are invoked by said checkpoint infrastructure; and
performing checkpointing of thread state both internally initiated for self-checkpointing threads and externally initiated for invoked-checkpoint threads.

7. A method as recited in claim 1, wherein a checkpoint is not generated for shared data if the values of said shared data have already been generated as part of a specific checkpoint.

8. A method as recited in claim 1, wherein interactions between threads through shared data are recorded in said checkpoints.

9. A method as recited in claim 8, wherein said interactions can be replayed during a restart of a replica.

10. A method as recited in claim 1, further comprising:
maintaining for each object, an object checkpoint number corresponding to the most recent checkpoint that said checkpoint infrastructure requested for said object;
maintaining for each thread, a thread checkpoint number corresponding to the most recent checkpoint that said thread generated; and
maintaining for each mutex, a mutex checkpoint number corresponding to the most recent checkpoint of the shared data protected by said mutex.

11. A method as recited in claim 10, wherein said checkpoint numbers are monotonically increasing.

12. A method as recited in claim 10, further comprising the synchronization of the checkpointing of objects, threads and mutexes based on comparison of said checkpoint numbers.

13. A method as recited in claim 10, further comprising generating a checkpoint by a self-checkpointing thread of an object as a result of comparing the thread checkpoint number of said thread and the object checkpoint of said object.

14. A method as recited in claim 13, wherein the need to generate a checkpoint for a self-checkpointing thread of an object is determined by periodically comparing the thread checkpoint number for the thread and the object checkpoint number for said object to establish that said checkpoint infrastructure has initiated a new checkpoint of said object.

15. A method as recited in claim 10, wherein the need to generate a checkpoint for the shared data of a mutex is determined by a comparison between the mutex checkpoint number for the mutex protecting said shared data and the thread checkpoint number for the thread claiming the mutex.

16. A method as recited in claim 15, wherein said comparison determines whether a checkpoint of said shared data is generated when claiming said mutex.

17. A method as recited in claim 15, wherein checkpointing of shared data is generated by an active replica, communicated to and logged at a new or restarting active replica along with mutex ordering and granting information generated by said active replica, which conveys to the new or restarting active replica the order in which mutexes are to be granted to threads along with the checkpoints of the shared data that are to be restored.

18. A method as recited in claim 1, further comprising invoking a preprocessor tool for inserting additional code into the source code of the application program to cause a self-checkpointing thread to record a checkpoint during normal operation and to restore the values of its attributes or variables subsequently.

19. A computer system upon which application objects are replicated using the active replication strategy, said computer system comprising:
replication software and checkpoint software executable on one or more networked computers;
means associated with said replication software for ordering message processing and mutex granting to said threads of said replicas, competitively based on the first processing or granting, wherein corresponding threads of the replicas process messages and are granted mutexes in the same order;
means associated with said checkpoint software for providing separate checkpointing of said threads and for each shared data shared between said threads and protected by a mutex, and for communicating mutex ordering information and checkpoints to a replica configured to start from said checkpoint.

20. A computer system as recited in claim 19, wherein said checkpoint information is communicated to replicas within mutex granting messages.

21. A computer system as recited in claim 19:
wherein said threads share data and in which access to each shared data is controlled by a mutex which is claimed by said threads to gain access to said shared data;
wherein said mutex provides said thread with exclusive access to said data;
wherein said mutex is controlled by a set of mutex functions;
wherein said mutex is granted to said threads of additional replicas in the same order as it was granted to the corresponding threads of said first replica; and
wherein a thread must release said mutex when it has finished accessing said data, allowing another thread to access said shared data.

22. A computer system as recited in claim 21, wherein said mutex functions comprise claim and release functions.

23. A computer system as recited in claim 21, wherein said mutex functions are contained in a multithreading library interposed ahead of an operating system thread library, said multithreading library containing wrapper functions for the functions of said operating system thread library that claim and release mutexes, semaphores and condition variables.

24. A computer system as recited in claim 23, wherein said wrapper functions determine when to checkpoint said shared data controlled by said mutex.

25. A computer system as recited in claim 19, wherein checkpoints for different threads are generated asynchronously.

26. A computer system as recited in claim 19, wherein generating a checkpoint for a thread is internally initiated for self-checkpointing threads and externally initiated for invoked-checkpoint threads.

27. A computer system as recited in claim 19, wherein a checkpoint is not generated for shared data if the values of said shared data have already been generated as part of a specific checkpoint.

28. A computer system as recited in claim 19, wherein interactions between threads through shared data are recorded during said checkpointing.

29. A computer system as recited in claim 28, wherein said interactions can be replayed during a restart of a replica.

30. A computer system as recited in claim 19, further comprising maintaining, for each object, a monotonically increasing object checkpoint number corresponding to the most recent checkpoint that said checkpoint infrastructure requested for said object.

31. A computer system as recited in claim 30, wherein a mutex checkpoint number is generated in response to the most recent checkpoint of said shared data protected by said mutex.

32. A computer system as recited in claim 31, wherein a thread checkpoint number is generated in response to the most recent checkpoint of said thread.

33. A computer system as recited in claim 32, wherein said generation of said checkpoint for the shared data is performed in response to a comparison between the mutex checkpoint number for the mutex protecting said shared data and the thread checkpoint number for the thread claiming the mutex.

34. A computer system as recited in claim 30, wherein said generation of said checkpoint for a self-checkpointing thread of an object is performed in response to periodically comparing the thread checkpoint number for the thread with the object checkpoint number of said object to establish that said checkpoint infrastructure has initiated a new checkpoint of said object.

35. A computer system as recited in claim 19, wherein a new or recovering active replica obtains checkpoints for shared data in the order in which the threads of an active replica claimed and released mutexes according to said competitive ordering.

* * * * *